US007180580B2

(12) United States Patent
Guruprasad

(10) Patent No.: US 7,180,580 B2
(45) Date of Patent: Feb. 20, 2007

(54) PASSIVE DISTANCE MEASUREMENT USING SPECTRAL PHASE GRADIENTS

(76) Inventor: Venkata Guruprasad, Apt. B6, 35 Oak St., Brewster, NY (US) 10509

( * ) Notice: Subject to any disclaimer, the term of this patent is extended or adjusted under 35 U.S.C. 154(b) by 318 days.

(21) Appl. No.: 10/884,353

(22) Filed: Jul. 2, 2004

(65) Prior Publication Data

US 2006/0007423 A1    Jan. 12, 2006

(51) Int. Cl.
 *G01C 3/08*    (2006.01)
(52) U.S. Cl. .................................................. 356/5.09
(58) Field of Classification Search ................ 356/5.09
 See application file for complete search history.

(56) References Cited

U.S. PATENT DOCUMENTS

| | | | | |
|---|---|---|---|---|
| 6,233,045 | B1 * | 5/2001 | Suni et al. .................. | 356/28.5 |
| 7,106,801 | B1 * | 9/2006 | Guruprasad .................. | 375/259 |
| 2006/0103571 | A1 * | 5/2006 | Isaji ............................. | 342/70 |

OTHER PUBLICATIONS

V. Guruprasad, "The Correct Analysis and Explanation of the Pioneer-Galileo Anomalies", published on the Internet at http://www.arxiv.org on Sep. 17, 1999 as arXiv:astro-ph/9907363 v4.
V. Guruprasad, "Relativity of Spatial Scale and of the Hubble Flow: The Logical Foundations of Relativity and Cosmology", published on the Internet at http://arxiv.org on May 4, 2000 as arXiv:gr-qc/0005014 v1.
V. Guruprasad, "Contraction and Distension by Tidal Stress and its Role as the Cause of the Hubble Redshift", published on the Internet at http://arxiv.org on May 22, 2000 as arXiv:gr-qc/0005090 v2.

* cited by examiner

Primary Examiner—Thomas H. Tarcza
Assistant Examiner—Luke D. Ratcliffe
(74) Attorney, Agent, or Firm—Ostrager Chong Flaherty & Broitman P.C

(57) ABSTRACT

General method for extracting source distance information from any kind of received radiation, including electromagnetic and acoustic, without involving round-trip time or phase in any form, and thus more truly passive than existing passive radars. The method exploits the facts that radiation from a real source must comprise wavepackets of nonzero bandwidth, that the individual frequency components of a wavepacket must have consistent phase at the source, and that their instantaneous phases must increase linearly along the path in proportion to the respective frequencies, so that the phase gradient across the components must be proportional to the distance travelled. The invention simplifies over naïve phase gradient measurement by scanning the phase gradient at a controlled rate, thereby converting the gradient into normalized frequency shifts proportional to the scanning rate and the source distance. It mimics the cosmological redshift and acceleration, but at measurable levels over any desired range and even with sound.

Potential applications include stealth and "unjammable" radars for the military, ranging capability for emergency services, commodity low-power vehicular and personal radars, simplification and improvements in radar and diagnostic imaging, improved ranging in general all the way from ground to inter-galactic space, "interference-free" communication systems including radio and television receivers, source-distance (or range-division) multiplexing improved cellphone power control and battery life, and continuous, transparent diagnostics for optical fibres, integrated circuits and transmission lines.

20 Claims, 6 Drawing Sheets

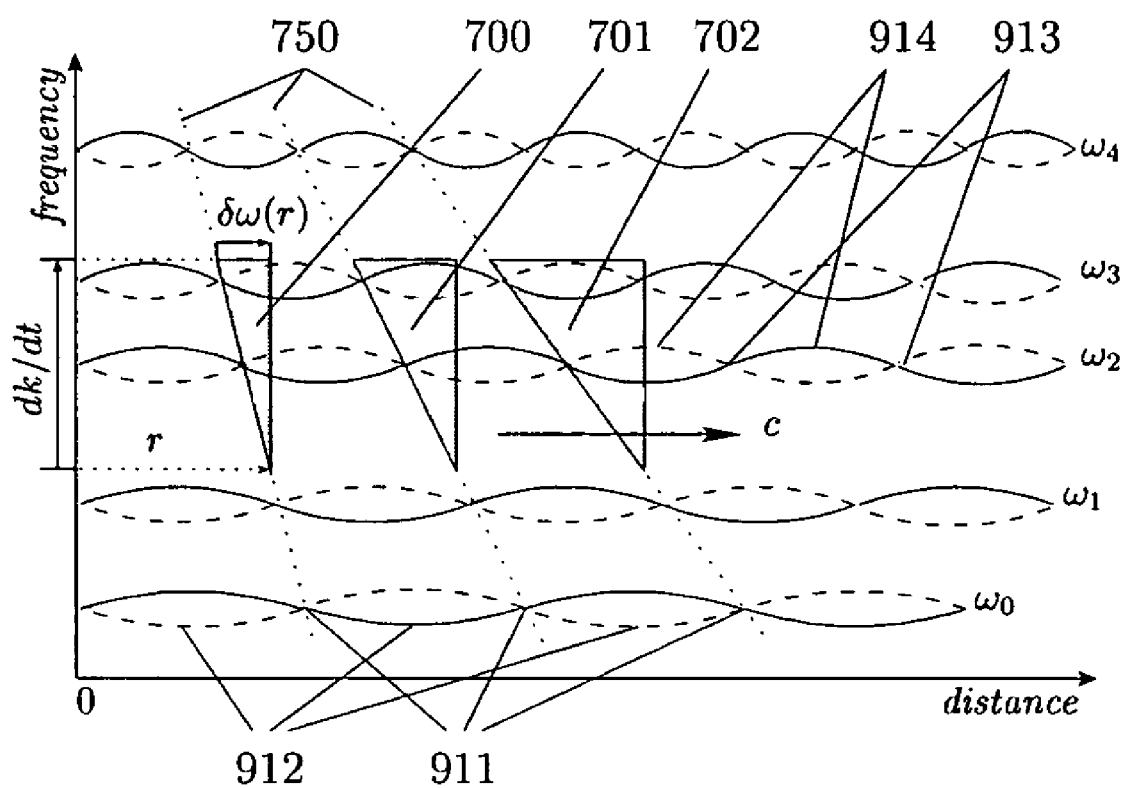
Figure 1: Distance information from phase gradient

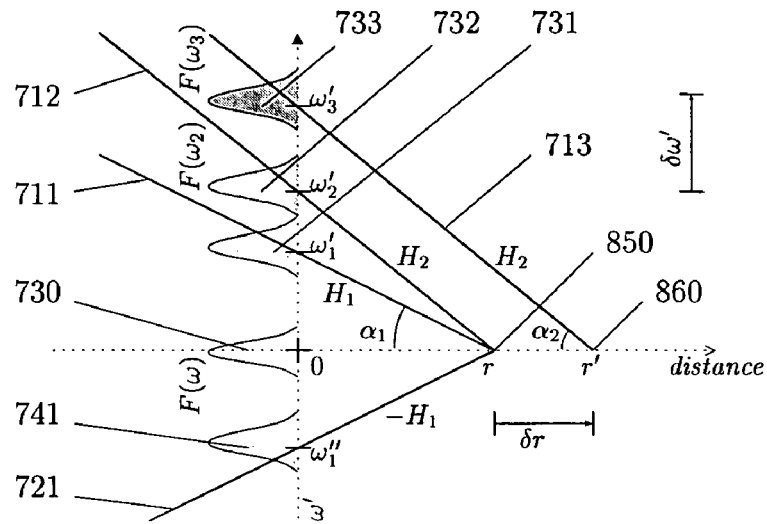
Figure 2: Temporal parallax
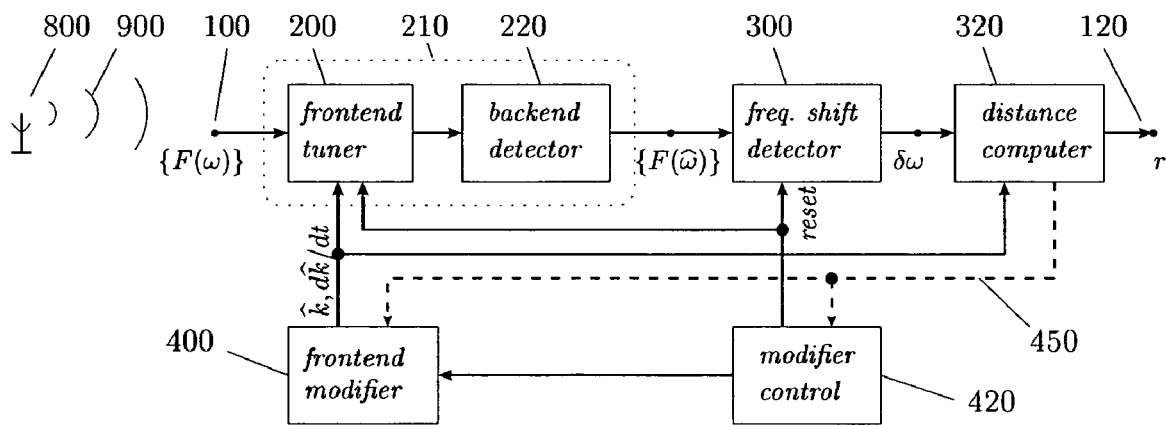
Figure 3: Block diagram of the preferred embodiment

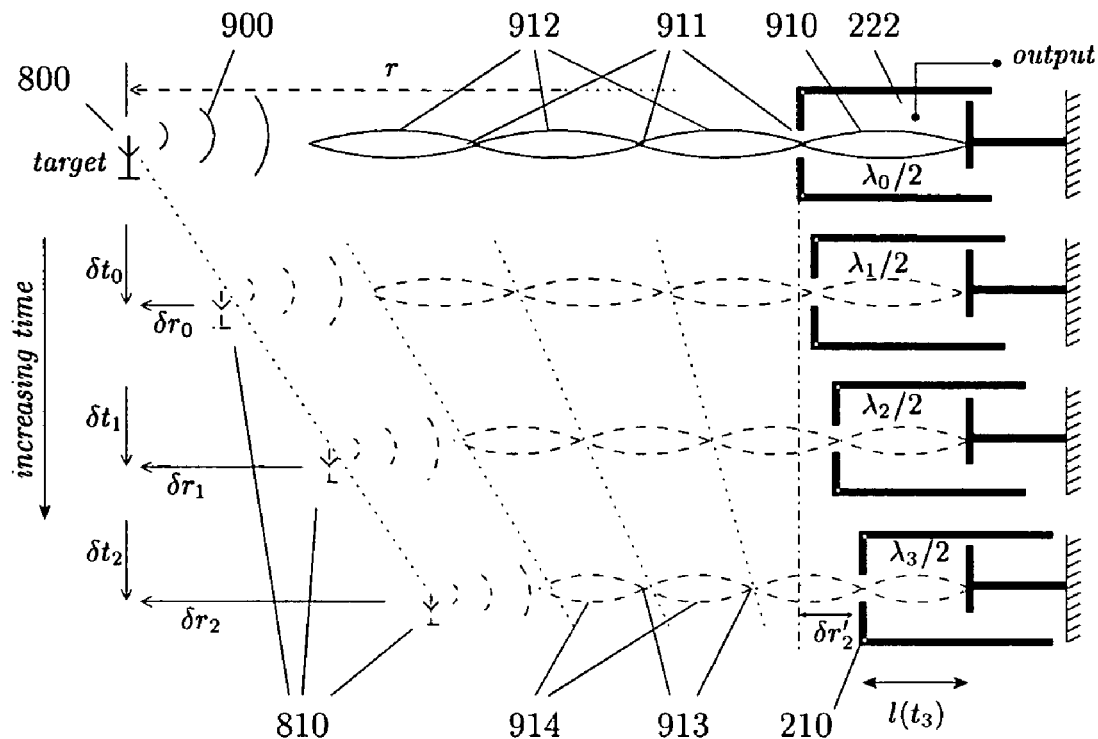
Figure 4: Theory of operation
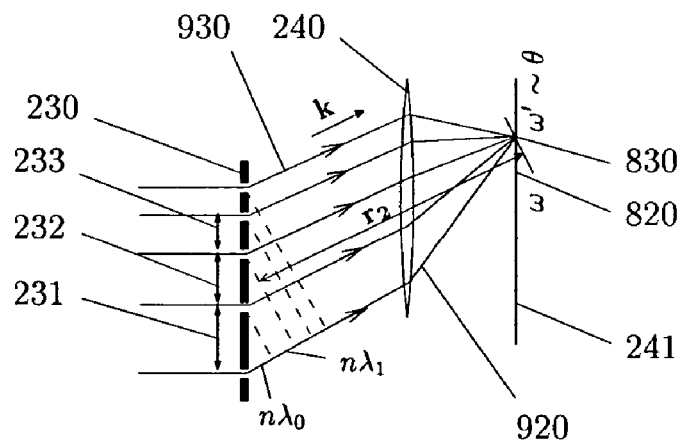
Figure 5: Application to a diffraction grating

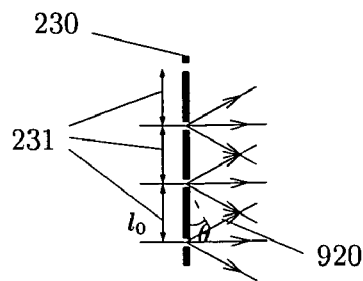
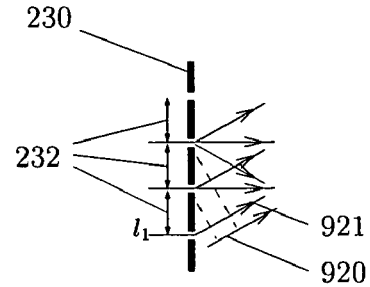
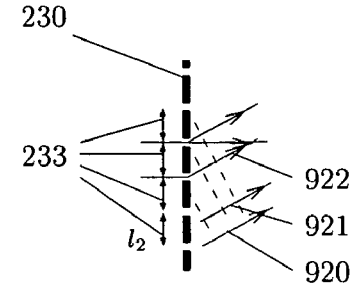
Figure 6: Diffraction at $t = t_0$    Figure 7: Diffraction at $t = t_1$    Figure 8: Diffraction at $t = t_2$
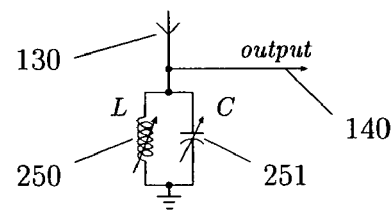
Figure 9: Application to a tank circuit
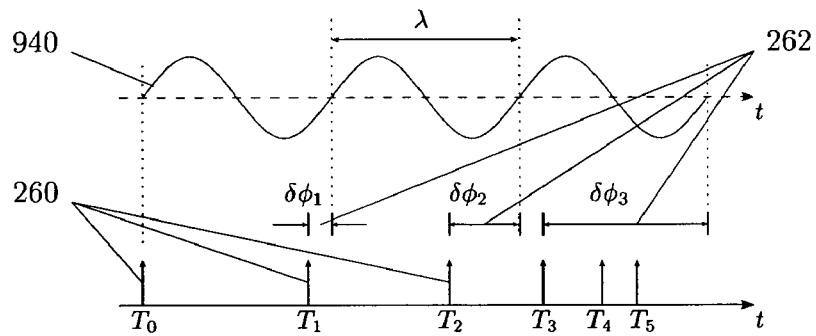
Figure 10: Time-domain analysis

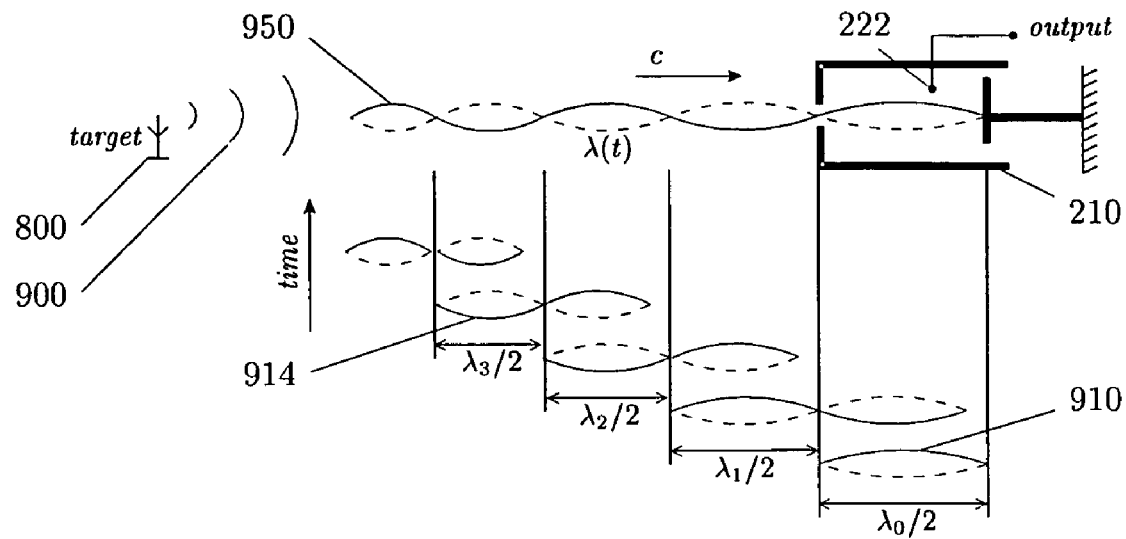
Figure 11: Time-varying eigenfunction
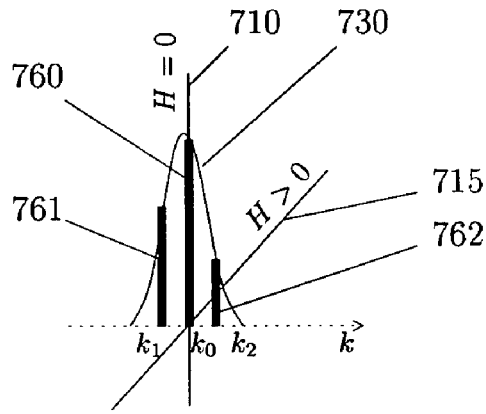
Figure 12: Contribution from varying wavelengths
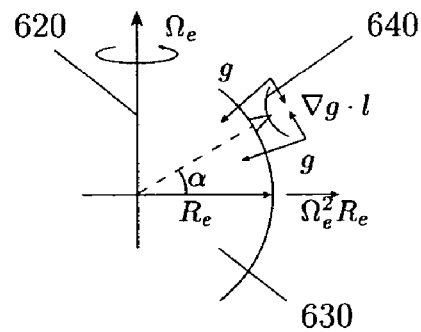
Figure 13: Shrinkage of telescope objectives

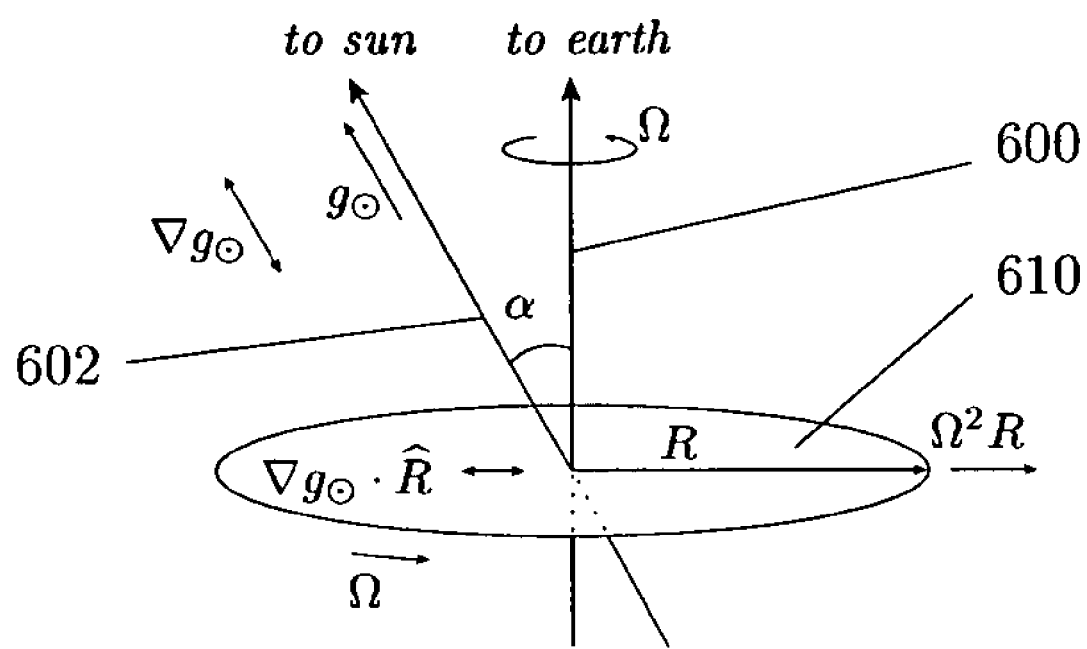
Figure 14: Centrifugal creep in Pioneers 10 and 11

PASSIVE DISTANCE MEASUREMENT USING SPECTRAL PHASE GRADIENTS

BACKGROUND OF THE INVENTION

1. Technical Field

This invention generally pertains to the measurement of the distance to a remote object. More particularly, it concerns passive monostatic ranging, that is, measuring distance using electromagnetic or acoustic waves without illuminating, or querying, the object with electromagnetic or acoustic energy, and without involving spatial parallax. A fundamentally new way is disclosed for extracting distance information from the spectral phase profile, i.e. the phase distribution across a set of frequencies, in a received signal, without requiring it to be reflected or transponded. The invention more specifically concerns extraction of this information as a hitherto unrecognized effect of the wave nature of electromagnetism and sound similar to the Doppler effect, but using only the instantaneous source distance and receiver-side operations.

2. Brief Description of the Prior Art

Problems of dependence on known illumination. Hitherto, the only ways to measure the distance r to a target have been by parallax, triangulation, or timing an echo or a returned transponder signal from the target, called the round trip time (RTT) measurement. All known radar techniques are primarily based on the timing approach, although parallax is implicitly utilized in some cases, notably synthetic aperture radar (SAR), which provides the imaging of static topographies using a moving platform for the radar.

The timing approach is constrained by problems of scalability, power and antenna size, since illuminating a target at range $r_{max}$ requires a power $P \propto r_{max}^4$ and equivalently, the range is limited to $r_{max} \propto P^{1/4}$ for an available power P. The power requirement can be alleviated by improving the receiver technology, using very low noise receivers and large antennas to collect more power. For example, A Freeman and E Nielsen of JPL have proposed a radar for mapping Kuiper Belt objects using a transmitter power of 10 MW, but located in space and with an antenna diameter of 1 km.

In all of the prior art, the need for illumination severely constrains radar technology. Even with very high power ground stations in NASA's Deep Space Network, accurate ranging of spacecraft in deep space has been possible only by using the onboard telemetry transponder to return a modulated signal instead of an echo, and thus reducing the power requirement to $r_{max}^2$. The method was described by P L Bender and M A Vincent in the August 1989 NASA Technical Report N90-19940 12-90, titled "Small Mercury Relativity Orbiter" and paper "Orbit determination and gravitational field accuracy for a Mercury transponder satellite", in Journal of Geophysical Research, volume 95, pages 21357–21361, December 1990. Methods depending on transponders can be useful only for specially equipped cooperative targets, however. Other reasons, such as avoiding giving away the radar's location, significantly add to the motivation for passive radar technologies.

Unfortunately, existing passive systems are again dependent on illumination from known source like radio and television broadcasting stations, as first described in the U.S. Pat. No. 3,812,493, issued in 1974, and in the recent years, from cellular telephone base stations. Secondly, the large number of illuminating sources and the complexity of their signals makes the extraction of useful information from the reflections an extremely difficult computational problem. Further, direct signals must also be collected from each of the illuminating sources for phase correlation with the target's echo, which means additional antennas and infrastructure. In any case, the method is limited to regions of the earth where there are adequate illuminating sources, and also cannot be employed for ubiquitous applications being envisaged, like ground vehicular guidance and collision avoidance, nor for earth orbit or deep space tracking, where the illumination is generally absent.

Another now well known terrestrial application concerns the requirement, in cellular telephone and wireless networking technologies, to limit the power transmitted by a mobile device, primarily so that the frequencies can be reused in other nearby "cells", and also to conserve its battery. RTT measurement is the only method currently available and requires each mobile device to transmit at least once, regardless of whether the base station or the mobile device measures the RTT.

A ranging method that does not depend on illumination, and would instead use the target's own emissions would be desirable both as an alternative in existing radar applications as well as for novel applications that are currently impossible or impractical. Its range would be governed by the inverse square law of one-way propagation in free space, instead of the fourth power law, and it would be therefore usable over much longer distances. Since no phase correlations with illumination sources would be required, the computation, if any, should be vastly simpler than that in current passive radars. A cellular device employing it would be able to gauge its distance from the nearest base station accurately from the latter's transmissions. In optical fibres and transmission lines in integrated circuit chips, degradation or breakage could be detected with absolutely no interruption of service, scheduled or otherwise.

Use of chirp or ramp signals. One way to describe the present invention is in terms of a signal with an exponentially increasing or decreasing frequency. Linear variation of frequency as $\omega(t)=\omega_0+at$, commonly called chirp in radar texts, in allusion to the acoustic echo location method used by bats. The RTT $\delta t$ is then directly obtained by measuring the frequency $\delta(\omega)=\alpha\delta t$ of the beat signal that results by summing the echo, of frequency $\omega(t)=\omega_0+\alpha(t-\delta t)$, with the instantaneous outgoing chirp signal. Note that ramping of the frequency is preferable to ramping of the amplitude because amplitude extraction is more vulnerable to noise and other problems. In both cases, the result must be corrected for the target velocity, which must be separately determined. A simple method for this is to change the slope $\alpha$ of the ramp, since the Doppler shift is invariant of $\alpha$ and can then be eliminated by comparing the results. However, these prior uses of chirps are for simplifying RTT measurement rather than eliminating it, and do not enable passive operation.

Wavelets analysis. A related description of the present invention is as a technique involving continuously varying frequency or time scales. A powerful means for analyzing multi-scale phenomena is now available in wavelet transforms. A fundamental difference remains, however, that the wavelet techniques are concerned with the scale distribution of the source signal, which cannot depend on the receiver's distance.

In the present invention, the scale variance is incorporated in the receiver, and the distance information is then associated with each individual frequency observed, independently of wavelet or other radar processing techniques that may be applied to the observations.

Variable tuners and diffraction gratings have been around for many decades as well, so it is reasonable to expect at least accidental observations of the inventive mechanism in the prior art. None is mentioned in the literature, however, likely due to several reasons which will become clearer from the Detailed Description.

The first problem is that without the requisite manner of control which will be specified, the mechanism would produce frequency shifts in the received waves proportional to source distances. The net result for a typical input signal comprising contributions from multiple sources is a dispersion that bears no discernible correlation to any of the individual input frequencies, and is therefore easily mistaken for transitional noise. This generally explains why the invention was hitherto unobvious from accidental observations, for example, from resonators like guitar strings or Fabry-Perot cavities of lasers while being setup or tuned.

A second problem particularly limiting the accidental category is that the invention requires an exponential profile of variation, or else the result is an even more complex form of dispersion from which the distance correlations are all the more difficult to recognize. It is hardly surprising, therefore, that transitory behaviour of tuned systems and spectrometers have been mostly ignored in prior art, with the exception of frequency modulation systems in communication. In the latter case, not only are the transition rates linear and limited in magnitude, but the modulation as such is applied at the source itself, so the possibility of distinguishing distance correlations is nonexistent.

With the controlled transitions now provided by variable tuners and gratings, two problems have served to limit prior discovery, the first being that all such variable systems, like frequency modulation, are designed primarily for linear variation. The second is that most such devices, especially the more accurate ones, are designed for controlling static selection of wavelength or frequency, whereas the invention concerns changing of the selection during observation. Most communication systems use phase-locked loops (PLLs) that prevent variation of the selection from the incoming carrier. Continuously variable diffraction gratings are available in the form of acousto-optic (Bragg) cells, but in this case, the grating is formed by an acoustic wave whose wavelength cannot be varied instantaneously across the spatial observation window.

A fourth class of problems that hitherto prevented discovery is especially clear in the case of digital signal processing commonly applied to both acoustic and radio signals. To begin with, the theoretical treatment was hitherto exclusively in terms of amplitudes, frequencies and phases, so the the source distance would be hidden in the phases and the start-time delay. Secondly, the data is conceptually decoupled from the sources and their distances by sampling and digitization, making a reverse correlation with the source distances all the more unintuitive. Thirdly, even with analogue recordings, the source distances generally manifest only as start-up delays in the time domain, with no real value as the source of the distance information. In the present invention, logical connection to the physical distance is maintained, as will become clear, by applying the inventive procedure only at the frontend of the receiver, and the source of the distance information is the spectral phase profile, applicable to a continuous signal, rather than the start-up delay, which would have required an RTT reference once again.

Availability of source distance information in the phase spectrum of a received signal was the subject of an imaging method described in the paper "Radar imaging by Fourier inversion" by V. Guruprasad and A. K. Bhattacharyya, in the *Proceedings of Union Radio Science Internationale*, 1986. The paper concerned imaging in a pulse radar in which the target is illuminated with pulses at regular intervals T. The illuminating spectrum contains harmonics at frequency intervals of 1/T as a result. Over the relatively small operating band, variations in the atmospheric dispersion can be ignored, so that the different frequencies propagate at almost the same speed c. Their phases vary at different rates, however, since a frequency $\omega$ by definition relates to phase $\phi$ as $\omega = d\phi/dt \equiv c d\phi/dr$, where r measures the path length travelled. Target features are then resolved along the radial direction from the radar by a simple Fourier inversion of the echo spectrum. Together with "aspect angle diversity" generally available from moving targets such as aircraft, this suffices to yield a distinguishing two-dimensional image of the electromagnetic features of the target.

This prior method thus extracts incremental distance information pertaining to displacements $\delta r$ between the target's features, rather than the full distance r from the source. In hindsight, it suggests likely presence of this information in the phase spectrum, as the limitation that prevented its extraction in the prior method was simply the operating bandwidth. Denoting the smallest resolvable phase difference as $\Delta\phi$, typically $\pi$ rad or better, the method differentiates objects or features $\Delta r = c\Delta\phi/\omega$ apart. Therefore, for the full range r to the target, we would need low enough frequencies $\omega \approx c\Delta\phi/r$, and if such frequencies were usable, we would not need the phase, or timing, reference of the illuminating pulses. Another reason for this conclusion is that sources or scattering centres form the centres of curvature of the spatial wavefronts, which are defined by phase contours, hence the source location information is encoded in every wavefront. This is precisely the information involved in the image reconstructed by a hologram, except that holographic reconstruction uses interference between multiple paths instead of frequencies.

The principal limitations of the modified pulse radar method described above are its dependence on long wavelengths, requiring $\lambda = O(r)$, and the problem of aliases, due to recurrence of the same phase at multiples of the wavelength. The method appears usable for underwater sonar, but numerous other techniques are well developed for this case. With electromagnetic waves, the method is unusable outside of a narrow range of distances because of the very high value of c: with $\Delta\phi = \pi$, it requires interrogation (illumination) at frequencies of 60 GHz at r=100 m, 6 GHz at 1 km and 600 MHz at 10 km. A method without a linear dependence on the wavelength would be clearly desirable. Intuitively, one would expect a heterodyning or modulation technique to be the answer, and NASA's deep space ranging technique mentioned above is a first step in this direction, although usable only for the small class of transponding targets.

Use of frequency instead of time reference. NASA's deep space technique includes tracking of residual Doppler shift in the modulated return signal, which has particularly revealed an "unmodelled acceleration" in "all six missions" to date involving spin-stabilized spacecraft, as reported by J. D. Anderson and others in *Physical Review D, vol.* 65, April 2002. Although the residual shift was measured relative to the original transmitted signal in this case, as in most existing Doppler radars, use of atomic and nuclear spectral lines to determine Doppler shifts is common practice in many fields. More particularly, normalized shift factors $z=\delta\omega/\omega$ are used in astrophysics as distance indicators on the cosmological scale.

The basic difficulty in using the same principle on a terrestrial scale is of course that measurable redshifts are only seen for very distant galaxies, meaning that the cosmological expansion is too slow to be usable for distance measurements even at inter-galactic scales. According to the Einstein-deSitter model, gravitational deceleration would have slowed the expansion down to the order of $10^{-41}$ m/s on the scale of earth's orbit (1 AU $150\times10^6$ km), as shown by Cooperstock et al. in the *Astrophysical Journal*, vol. 503, pages 61–68, 1998. One explanation of why the relativistic expansion cannot occur on short distances is that if the atoms of an observer were to be expanding at the same rate, the expansion itself would be unobservable, as discussed, for example, in Misner, Thorne and Wheeler's *Gravitation*, Freeman, 1973 (page 719).

Incidentally, several researchers have pointed out that the Pioneer acceleration appears to be indication of the expansion persisting undiminished from its large scale value $H_0 \approx 67$ km s$^{-1}$ Mpc$^{-1} \approx 2.17 \times 10^{-18}$ s$^{-1}$ on the solar system scale. The expansion is known to be undiminished on the scale of our local group of galaxies, posing the dual problems of "flatness", reflecting a remarkable balance between classically expected gravitational deceleration and the acceleration, and "quietness", as the repulsive force presumably responsible does not present fluctuations consistent with a gas-like pressure. As a possible alternative explanation which is cited by Anderson et al. and led to the present invention, it was suggested in manuscript astro-ph/9907363 posted on the preprint archive server http://www.arxiv.org that the cause could even be simply terrestrial, describing complete empirical consistency of planetary, lunar and terrestrial data. Assuming this hypothesis to be valid, the available expansion rate would still be only $O(10^{-18})$ s$^{-1}$.

Further, even if the cosmological expansion were large enough to be usable for terrestrial measurements, we would still be confined to a smaller range of scales than with a method that did not depend on a natural phenomena but instead involved a human-controllable parameter.

Use of receiver modification. The present invention was inspired by a detailed analysis and alternative explanation of the Pioneers' anomalous acceleration in astro-ph/9907363 and gr-qc/0005090, viz slow but steady shrinkage of instruments on earth and in low earth orbits due to ordinary creep under the compressive force of earth's gravity and the tidal action of the moon and the sun. A third manuscript gr-qc/0005014 gives a first-principles derivation of special and general relativity from analysis of the role of the instrument scales in physical measurements and overcomes the unobservability problem with expansion on short scale that limits the relativistic theory. This was called "space-time elasticity theory" by Anderson et al., but the key mechanism is inelastic and macroscopic, and the second aspect enables general use.

The theory also fundamentally differs from a more naïve relativistic intuition, attributed to Eddington, that a uniform expansion of the universe would be equivalent to a uniform shrinkage of every atom, in that the scale of the atomic structure cannot be affected by macroscopic phenomena like creep. More significantly:

The creep rate would be different onboard a spacecraft, on another planet or in another solar system, and further, vary with time in all cases as the tidal stresses evolve.

The cosmological expansion and acceleration would be virtual, with different values depending on the platform they are measured from.

Both quantities would also vary slowly at each location, and exhibit directionality correlating with the local tidal stresses. From aboard the Pioneer spacecraft, the universe would have appeared to be static along the spacecraft's spin axis and contracting, with the acceleration, in transverse directions.

Both quantities would be more specifically determined by the negative of the observer's local, instantaneous creep rate and its square, respectively. This relation had been derived some years before the discovery of the acceleration in 1998. The corresponding variation between ground and deep space clocks revealed by the Pioneer anomaly, which had seemed hopeless to propose, had been anticipated months before NASA's first report in October, 1998. The same relation holds for the present invention, but the creep is as unusable for general ranging purposes as the cosmological expansion, for the same reasons of smallness and uncontrollability.

The creep hypothesis had presented a few secondary difficulties in the past, notably the consistency of the current cosmological measurements between telescopes of different constructions and at different latitudes, including those in space, such as the Hubble. A related difficulty was that the difference between the residual anomalies of the two Pioneer spacecraft had to be attributed to difference in the galactic tidal action, which would be several orders smaller than the residual difference. Another difficulty lay in explaining the apparent continuity of the Hubble redshifts, as the required creep rate corresponds to a fraction of a nuclear diameter over the course of a second in any reasonably sized telescope. These difficulties have now been resolved and the solutions will be briefly discussed in the Detailed Description to further illustrate the mechanism of the present invention, which also provides a means for measuring such small creep rates for the first time.

Relation to quantum theoretic notions. Following Einstein's theory of photoelectricity, a corpuscular view of light and particles has become pervasive. According to this view, the wave nature manifests only in matters directly concerning phase, such as diffraction and the Aharanov-Bohm effect of the magnetic vector potential A on particulate diffraction patterns, and even then, only statistically, since the Schrödinger wave equation involves to probability amplitudes instead of actual particles. Consequently, it has become usual to think of a photon as the monochromatic energy quantum of Einstein's theory, given by Planck's quantization rule $E=h\nu$, where $\nu$ is the frequency. Correspondingly, the thermal spread of spectral lines is commonly regarded as primarily statistical, with individual photons still representing single frequencies.

There are two basic discrepancies within this view which have hitherto defied detailed treatment:

First, as familiar to astronomers studying very distant galaxies, there are steady sources whose pictures are constructed by counting individual photons. The spectral spread cannot be zero for an individual detected photon because a pure sinusoid, by definition, cannot end in the detector. The very fact that the photon is detected thus contradicts the corpuscular notion of intrinsic quantization of the incoming radiation into monochromatic energy quanta.

This issue is distinct from the relativistic question of the speed of information, which would be associated with the velocity of the received photons as a group—the problem concerns the very transfer of individual energy quanta. Treating them as wavepackets would again question their monochromaticity.

The second discrepancy is the associated idea that source distance information can be present in received radiation only as the spatial curvature of the wavefront, which requires multistatic reception to exploit, or the inverse-square law intensity decay, which can be exploited only for "standard candles" of known source intensities. The presence of source distance information in phase envelopes, as revealed by pulse radar imaging, has been unobvious because it cannot be regarded as a statistical result, given that the statistical nature of quantum wavefunctions concerns their amplitudes rather than their phases.

The only solution to the first problem is to return to the pre-Einstein notion of photons as energy transitions at the detector. This not only preserves Planck's quantization, but does actually explain the very properties of photoelectricity that had led to Einstein's theory and its validation by Millikan ("A Direct Photoelectric Determination of Planck's h", *Physical Review*, vol. 7, pages 355–388, 1916). The near-instantaneous response is accurately modelled in the subsequently developed quantum treatment primarily in terms of the detector states. In the second quantization formalism of quantum electrodynamics, which most closely represents the intrinsic quantization notion, photons constitute standing or travelling wave modes of the overall radiation field, rather than isolated packets of radiant energy.

In this refined view, the present invention concerns detector state transition events representing photons that are inherently nonsinusoidal, and therefore capable of bearing distance information. There is no loss of generality either, as will become clear. These concerns are, of course, irrelevant in acoustic applications.

Use of atmospheric characteristics. Other passive methods for determining source distances have been described in U.S. Pat. No. 5,894,343, issued 13 Apr. 1999 to H A French of the UK, and other patents referenced in that patent. These methods exploit atmospheric effects on the source spectra to gauge the distances, and are therefore limited to thermal sources emitting blackbody spectral distribution at elevated temperatures, and to atmospheric ranges with known behaviour.

SUMMARY OF THE INVENTION

Accordingly, a primary object of the present invention is to provide a very general passive ranging technology which would scale to much greater distances and be applicable to any and every observable target. A related object is to dramatically reduce the required operating power. A secondary object is to improve safety and health by reducing exposure to radar illumination. Another secondary object is to simplify the measurements and the computations involved in radars and sonars. A further motivating object is a deeper understanding of wave properties which are fundamental to electromagnetism, quantum and relativity theories, and of the mechanics of interaction between radiation and matter. Yet another secondary object is providing practical means for measuring the microscopic damage of tidal forces both on earth and in interplanetary missions.

A. Principle of Operation

These objects, and others which will become apparent, are achieved in the present invention by applying, to a spectrally sensitive frontend means, such as a tuned antenna or a telescope mirror, in a receiver receiving electromagnetic or other kinds of waves from a distant target, a continuous modification at a normalized rate $\beta$ (per second), measuring resulting normalized shifts $z \equiv \delta\omega/\omega$ (dimensionless) of one or more frequencies $\omega$ in the spectrum of the received waves, and computing the distance r to the target using the formula $$r = \frac{cz}{\beta}, \quad (1)$$

where c is the speed of the incoming waves. The invention exploits a basic property of a sinusoidal travelling wave, $f(r, t) = e^{i(kr - \omega t)}$, that its phase at a distance r from the source is given by the exponent factor $$\phi = kr - \omega t, \quad k \equiv 2\pi/\lambda \quad (2)$$

where k is variously called the wavevector or wave number, and $\lambda$ is the wavelength. The first term on the right is the path contribution to the instantaneous phase. A phase increment can arise from this term due to either a change of distance $\Delta r$ or a change in the selection of the wavevector $\Delta k$; that is, $$\Delta\phi|_{\omega,t} = k \cdot \Delta r + \Delta k \cdot r \quad (3)$$

The first term on the right, $k \cdot \Delta r$, is involved in both the Doppler effect and traditional phase-based methods like holography and synthetic aperture radar, which depend on phase differences at individual frequencies.

The present invention concerns the second term, which may be rewritten as $$r = \frac{\Delta\phi|_{\omega,t,r}}{\Delta k}. \quad (4)$$

This includes pulse radar imaging, as discussed in the Background, in which the illuminating pulse train is equivalent to a "comb" of frequencies, providing frequency-diversity for differentiating target features along the radial direction. Its range is limited, however, as it uses fixed $\Delta k$, and active illumination.

For unlimited range, a naïve application of equation (4) would require accurate selection of pairs of close frequencies differing by a small $\Delta k$ and equally precise measurement of their instantaneous phases, since for $r \to \infty$ and $0 \leq \Delta\phi < \infty$, equation (4) implies $\Delta k \to 0$, and would lead to issues of mutual dependence and uncertainty, whereas only the values of $\Delta k$ and $\Delta\phi$ should be relevant.

The present invention concerns further simplification by the use of rates of change for either factor in equation (4), i.e. sweeping across the spectrum, to obtain the target distance as the ratio $$r \equiv \frac{\Delta\phi|_{\omega,t,r}}{\Delta k} = \lim_{\Delta t \to 0} \frac{\Delta\phi|_{\omega,t,r}/\Delta t}{\Delta k/\Delta t} = \frac{\partial\phi/\partial t|_{\omega,r}}{d\hat{k}/dt} \equiv \frac{\delta\omega|_{\omega,r}}{d\hat{k}/dt}, \quad (5)$$

which assumes that the different frequencies in each wavepacket start with a consistent phase. The notation $\hat{k}$, instead of k, indicates selection rather than an intrinsic property of an incoming wave. The numerator $\delta\omega$ represents a shift in the measured frequency, and is almost always easier to measure more precisely than phase. Its proportionality to r means that the shift $\delta\omega$ cannot be confused for a calibration error introduced by the modification. The denominator $d\hat{k}/dt$ is the inventive modification to the spectral means, defining the rate of change of its frequency selection, and as the applied variable, it can be precisely controlled. Equation (1) then follows as $$\frac{\delta\omega}{d\hat{k}/dt} = \frac{\delta\omega}{d(\hat{\omega}/c)/dt} = \frac{c\delta\omega}{d\hat{\omega}/dt} = \frac{\hat{\omega}^{-1} \cdot c\delta\omega}{\hat{\omega}^{-1} \cdot d\hat{\omega}/dt} = \frac{cz}{\hat{\omega}^{-1} \cdot d\hat{\omega}/dt}, \quad (6)$$

where $\hat{\omega} \equiv \hat{k}c$ is a frequency instantaneously acted upon by the frontend, together with the definition of the normalized modification rate $$\beta = \frac{1}{\hat{\omega}} \frac{d\hat{\omega}}{dt} \equiv \frac{1}{\hat{k}} \frac{d\hat{k}}{dt}, \quad (7)$$

where t denotes observation time, distinct from the path time $r/c$. The invention makes two improvements over the cosmological distance scale critically needed for ordinary terrestrial and near space distances.

First, the shifts are produced at the receiver itself, without depending on cosmological causes, so that much higher values of β become available enabling measurements even on very short ranges. The production of the shifts from (the unknown) r is contained in equations (5), (6) and (7) as $$\delta\omega = r \, d\hat{k}/dt = r\hat{k}\beta \quad (8)$$

Second, the larger shifts can be identified and measured even without atomic or nuclear spectral lines for reference, as at longer wavelengths or with sound, simply by comparing the shifted spectrum against the unshifted spectrum of the same target, or against shifts obtained from a different value β' for β, preferably a multiple of the first, e.g. β'=0, β'=-β, β'=2β, etc. An (unmodified) Fourier spectrum corresponds to β' (or β)=0 (see equation 12 below).

B. Interpretation of the Inventive Frequency Shift

Frequency selection is ordinarily governed by the orthogonality condition, $$\int_t e^{i\hat{\omega}t} e^{i(kr-\omega t)} dt = \int_t e^{ikr} e^{i(\hat{\omega}-\omega)t} dt = e^{ikr}\delta(\hat{\omega}-\omega) \quad (9)$$

where $\delta(\ )$ is the Dirac delta function, defined as $\int_x \delta(x)dx=1$ and $\delta(x)=0$ at all $x\neq 0$; the integration is over observation time; and the path phase contribution, $\exp(ikr)$, is usually inconsequential and ignored.

It will be proved in the Detailed Description that the modified selection corresponds to $$\int_t e^{ikr[1+r\beta/c]} e^{i(\hat{\omega}[1+r\beta/c]-\omega)t} dt = \quad (10)$$

$$e^{ikr[1+r\beta/c]}\delta(\hat{\omega}[1+r\beta/c]-\omega) \equiv e^{ikr[1+r\beta/c]}\delta\left(\hat{\omega}\left[1+\frac{r\beta}{c}\right]-\omega\right).$$

In the language of quantum mechanics, the ordinary orthogonality condition, equation (9), would be written $$<\hat{\omega}|\omega, r> = e^{ikr}<\hat{\omega}|\omega> \quad (11)$$

and equation (10) becomes $$\left\langle \hat{\omega}, \frac{d\hat{\omega}}{dt} \middle| \omega, r \right\rangle \equiv \langle \hat{\omega}|H|\omega, r\rangle = \quad (12)$$

$$e^{ikr[1+r\beta/c]}\left\langle \hat{\omega} \middle| \frac{\omega}{1+r\beta/c} \right\rangle = e^{ikr[1+r\beta/c]}\delta\left(\hat{\omega} - \frac{\omega}{1+r\beta/c}\right),$$

where $<\hat{\omega}, d\hat{\omega}/dt|$ and $<\hat{\omega}|$ are the modified and unmodified states of the receiver, respectively, the modification being described by the "virtual Hubble flow" or "spectral phase gradient" operator $$H|\omega, r\rangle = e^{ikr[1+r\beta/c]}\left|\frac{\omega}{1+r\beta/c}\right\rangle, \quad (13)$$

where $|\omega, r>$ more fully represents the incoming wave. (This use of notation H for the inventive modification is based on its similarity to the Hubble flow in astrophysics, to be explained in the Detailed Description. We would instead use E for the quantum Hamiltonian operator.)

It would be noticed that equations (12) and (13) attribute the shift to the incoming frequency ω, instead of the instantaneously selection $\hat{\omega}$ in equation (10). The transposition is necessary as in the quantum formalism, $<\hat{\omega}|$ must represent the final state of the observation.

This shift of reference is mathematically straightforward as $\delta(\ )$ is nonzero only at $\hat{\omega}(1+r\beta/c)=\omega$ and the integrals $\int_{\hat{\omega}}d\hat{\omega}\delta(\hat{\omega})$, and $\int_{\hat{\omega}}d\hat{\omega}\delta(\hat{\omega}[1+r\beta/c])$ differ only by a constant that represents the difference of scale. As this scale factor is independent of both $\hat{\omega}$ and ω, the amplitudes $<\hat{\omega}(1+r\beta/c)|\omega>$ and $<\hat{\omega}|\omega/(1+r\beta/c)>$ represent the same probability spectrum. Physically, however, they signify different processes, since $<\hat{\omega}|\omega/(1+r\beta/c)>$ is the amplitude for a lower frequency $\omega/(1+r\beta/c)$ being observed at $\hat{\omega}$, whereas $<\hat{\omega}(1+r\beta/c)|\omega>$ is the amplitude for an incoming frequency $\omega=\hat{\omega}$ getting scaled up by the observing process to $\hat{\omega}(1+r\beta/c)$.

The derivation of equation (5) seems to indicate the latter as equation (4) specifically concerns a differential pair of wavenumbers k which would have each ordinarily selected ω.

The quantum version holds nevertheless because in taking the time derivatives in equation (5), we also lost the usual connection of k to the instantaneous component $\omega=\hat{\omega}$ in the incoming waves, and are left only with a δω signifying the instantaneous rate at which the receiver scans the static phase gradient contributed by the target distance r, given by $$\frac{d\phi}{dk} = \lim_{\Delta k \to 0} \frac{\Delta\phi|_{\omega, t, r}}{\Delta k}. \quad (14)$$

This phase gradient was unused in all of physics: it will be shown in the Detailed Description that it signifies a temporal analogue of the spatial curvature of wavefronts. The scanning of this phase gradient yields the frequency shift factor $1+r\beta/c$ at each $\hat{k}$. Whether we measure (the amplitude of) ω at $\hat{\omega}=\omega/(1+r\beta/c)$ or (the amplitude of) $\omega=$(the instantaneous) $\hat{\omega}$ at $\hat{\omega}(1+r\beta/c)$ depends on the subsequent "backend" filter, detector or other measuring means or procedure employed.

C. Principal Characteristics

Several distinguishing properties of the inventive frequency shift $\delta\omega$ follow from the basic principles of the invention just described. The proportionality of the shift to $\omega$ (equation 12) makes it similar to the Doppler effect and means that it preserves geometrical relations between spectral lines. The ratios of atomic spectral lines are exactly preserved, which is necessary for any alternative explanation of the cosmological expansion, such as the creep hypothesis mentioned in the Background.

As will be established in the Detailed Description, the frequency shifts do represent a Doppler effect from virtual motions of the targets, caused by the scale factor $1+r\beta/c$ introduced by the inventive modification. Though dependent on r, the scale factor itself is essentially static, yet causes instant virtual motions of all observed targets, given by $$v_v(r) = \beta r \qquad (15)$$

consistent with the fact that $\beta$ has the dimensionality of $[T^{-1}]$ (i.e. of the reciprocal of time). There is also an implied acceleration precisely matching the "deceleration coefficient" $q=-1$ cosmologically observed.

Secondly, though the shift would be measurable at each $\bar{k}$ at which $\beta\neq 0$, it is not a function of individual received frequency components, but, as already explained, of the (static) phase gradient $d\phi/dk$ (equation 14), the limit being achieved by scanning both and taking $\Delta t \rightarrow 0$ in both the numerator and the denominator. If only one frequency were present, the shifted signal would have zero amplitude as a lone component can at most provide a momentary contribution in each scan. A measurable amplitude can result only at frequencies around which a nonzero bandwidth is populated in the incoming waves. Fortunately, this is always the case with real targets because a perfectly monochromatic source is impossible. In particular, only a differential bandwidth is required at each frequency, so at optical and higher frequencies, where photon transition times are generally very short relative to observation times, the brightness of real targets would be preserved.

Thirdly, the phase gradient forms envelopes across the spectrum analogous to the wavefronts formed across space, as mentioned. As will be explained, the present invention constitutes exploitation of a temporal form of parallax, in which the modification rate $d\bar{k}/dt$ is the corresponding form of angular displacement of the receiver relative to the source. In holography, which concerns the other term in equation (3) and involves the recording and reproducing of phase differences $\Delta\phi$ due to spatial displacements $\Delta r$ at individual frequencies, the angle of view does relate correspondingly to spatial frequencies.

These notions help explain the apparent physical connection to the source. This connection was hitherto unintuitive because the phases of individual frequency components evolve independently though concurrently, per equation (2). Within each component, each cycle is identical to the next but for the amplitude decay, but the latter is not of concern in the present invention.

The "memory" of the source, according to the above notions, lies embodied in the phase gradient pattern across the frequencies, rather than the waveform pattern of any of them. This phase gradient memory gets overwritten whenever the phase evolution deviates from equation (2) nonuniformly across frequencies, so that it would be generally unaffected by dispersion-free deflection, but would take on the distance information of dispersive or reemitting scatterers. The expected transparency of dispersion-free deflectors is hardly special and would not pose a serious problem as the transparency would be limited to specific frequency bands and would be absent around the edges of the deflecting body or medium.

D. Forms of Embodiment

In receivers involving a physical spectrally sensitive frontend means such as a diffraction grating, a resonant cavity, or a tuned circuit, the inventive modification is suitably applied to the physical frontend means.

Specifically, in a receiver using a resonant cavity, the inventive modification consists of continuously varying the length of the cavity. In a receiver using a tuned circuit for frequency selection, the modification similarly comprises continuously varying one or more tuning elements in the circuit, such as an inductor, a capacitor or a resistor, or a combination of such elements in some proportion.

In a receiver using a diffraction grating, the inventive modification consists of uniformly varying the grating intervals during observation. In a receiver using a refractive element like a prism, the modification consists of uniformly varying the optical thickness of the element, that is, its thickness or its refractive index.

In receivers employing sampling as frontend means and computing the received spectrum from the sampled data, the inventive modification correspondingly consists of continuously varying the sampling interval. The spectral sensitivity in the sampling frontend lies in the calibration of the computed spectrum in terms of the sampling interval, since a given sequence of sampled amplitude data would always yield the same numerical output, which would represent different frequency ranges depending on the actual sampling (time) interval that was used in the sampling frontend. Accordingly, the desired controlled variation $d\bar{k}/dt$ is obtained by not compensating for the variation of the sampling interval in the subsequent computation of the spectrum. Alternatively, uniformly sampled values may be interpolated to simulate the interval variation, provided the original sampling interval is sufficiently fine and a large enough number of samples are available to permit a meaningful interpolation, since the inventive procedure calls for exponential variation of k in order to achieve a steady, desired value of $\beta$, as implicit in equation (7).

In all cases, the spectral means may be reset and the inventive modification repeated at short time intervals, in order to facilitate the measurement of the frequency shift. The repetition period can be made as short as micro-seconds at optical frequencies, so that the shifted spectra can appear steady to the human eye.

An immediate variation consists of inverting the direction of the inventive modification between alternate repetitions, reversing the sign of $\beta$. This would not only avoid having to explicitly reset the spectral means, but would also avoid losing the incoming energy during the resets, and provide a differently shifted spectrum to compare with for the purpose of identifying and measuring the shifts. A related variation is to employ a second receiver in parallel, unmodified or with a different modification rate, to provide the comparison.

Another general variation of the invention is to briefly increase or decrease the inventive modification $\beta$ so as to magnify the shifts for studying specific targets or their features. By equation (1), the magnification would manifest instantly at all r.

Another form of embodiment concerns use of the above principles in reverse for measuring ongoing damage on instruments caused by local planetary tidal forces. The inventive method comprises constructing a means for spectral selection or decomposition out of the same materials as the instruments, combining this means with (or building it into) a telescopic means for observing distant known objects, such as stars or galaxies, and determining the frequency shifts in the radiation received from these objects to obtain a corresponding mean value for $\beta$, say, $\beta_0$, which quantifies the (local) natural creep rate (or other natural causes).

A variation on this is to vary the inventive modification rate $\beta$ itself, seeking a value $\beta = -\beta_0$ at which the observable effects of the natural rate $\beta_0$ would vanish.

Yet another variation is to apply nonzero modification rates $\beta$ to a mix of incoming signals from multiple targets, and to thereby separate the targets by comparing the resulting shifted spectra.

E. Advantages and Applications

The principal advantage of the present invention over most known distance measuring techniques is its truly passive nature. This enables its use over larger distances than any current technology, in both near and deep space, as it leads to an $r_{max} \propto P^{1/2}$ power-range law, and avoids dependence on a reference illumination.

Additional advantage is likely greater accuracy over non-parallax non-RTT methods such as the "standard candles" of astrophysics, its expected accuracy being comparable to those provided by spatial parallax. These advantages would likely hold well into inter-planetary and inter-galactic scales as well.

Its truly passive nature is of advantage also over current terrestrial passive radar systems, in being usable even in regions where the illumination by broadcast and cellular base station transmissions is unavailable or inadequate. In this case, it becomes limited to targets providing some electromagnetic emission, such as an infra-red heat signature, and reduces to a substitute for simple parallax. There is advantage over ordinary parallax, however, as the inventive method requires only one directional listening antenna.

The inventive method further provides a simple means for separating targets and target features by their radial distances to augment or simplify both active and passive radar systems, as it does not require phase or round-trip timing correlation with reference illumination. This correlation is the reason for much complexity in the radio-frequency (RF) section of existing monostatic radars, and the realizable isolation between the sending and receiving sides sets a limit on their performance. The present invention would enable the two sides of the RF section to be decoupled without loss of information.

Yet another advantage of the present invention, again due to its truly passive nature, is the elimination of about half the total propagation delay incurred in most current radars, taken by the interrogating pulse. In applications like space-based missile defence, the RTT would be a sizable fraction of a second, depending on the range of the target, and halving it would mean greater accuracy of tracking.

Its lower power requirement, without the sensitivity and computational complexity of current silent radars, together with the elimination of microwave emission, makes the present invention ideal for a whole generation of ubiquitous "consumer radars", ranging from automobile collision avoidance radars to smarter, smoother door openers, proximity sensors, etc.

Another illustrative application that has emerged in recent years concerns the requirement of transmitter power control in cellular telephony, which is critically needed in order to reuse the same frequency channels in other cells. In code-division multiple-access (CDMA) (or spread-spectrum) cellular services, power control is needed across mobile units to balance the received signal levels at the base stations to allow proper reception.

The usual procedure for cellular power control is to have the base station respond to an initial transmission from a mobile device, instructing the latter to raise, or more likely lower, its transmitting power. If the mobile units could even approximately but reliably estimate their distances from the base stations, they could avoid emitting making initial transmissions at higher power, which would not only better conserve their batteries, but also reduce interference and allow better use of the available bandwidths. The power setting instructions from the base stations could be largely eliminated, releasing more channel time for actual communication. The present invention would enable reliable base station distance estimation without RTT measurement, saving battery power as well as helping to improve service.

Yet another illustrative application of the invention concerns locating breakages or nonuniformities in an optical fibre or a transmission line. The main advantages over current techniques are the same as those over the current radar technologies, viz elimination of phase reference and coherent processing, lower power and scalability. The phase reference elimination means that the requisite excitation can be applied at either end and have any waveform, so that the method can be employed continuously using the data stream itself while the line or fibre is in operation, and, importantly, with much less analytical complexity for determining the discontinuities and imaging their distribution along the physical channel.

The present invention provides a ready means for separating signal spectra from different sources according to their distances, as mentioned, with numerous advantages. This would allow improved separation of signals overlapping in frequencies, for example, allowing CDMA cells to be made smaller, or communication bands to be reused even without code division, providing what could be referred to as source-distance multiplexing (SDM), and "interference-free" communication receivers compared to present technology.

This distance separation capability would also simplify target separation in radar and sonar, and enable two dimensional imaging similar to synthetic aperture radar but without coherent illumination. The separation would enable radar receivers to become more resilient to jamming ("unjammable radars").

Finally, as will be shown in the Detailed Description, the inventive frequency shifts are indeed as general and fundamental as the Doppler effect. The invention may be applied, therefore, to any kind of propagating waves, including sound, as mentioned, and even the de Broglie waves of matter.

Variations

Other objects, features, variations and advantages of the present invention will be apparent when the detailed description of the preferred embodiment is considered in conjunction with the drawings, which should be construed in an illustrative and not limiting sense.

BRIEF DESCRIPTION OF DRAWINGS

FIG. 1 is a graph illustrating the operating principle of the present invention.

FIG. 2 graphically illustrates the notion of temporal parallax given by the present invention.

FIG. 3 shows a schematic block diagram of the preferred embodiment of the present invention.

FIG. 4 illustrates the physics of the inventive modification in a receiver using a resonant cavity.

FIG. 5 illustrates the physics of the inventive modification in a receiver using a diffraction grating. FIGS. 6, 7 and 8 show three successive snapshots in time of the setup of FIG. 5 as the modification is applied.

FIG. 9 shows the tuning section of a receiver using a "tank circuit" to which the invention may be applied.

FIG. 10 is a plot illustrating the extraction of the phase gradient in a receiver using sampling and computation of the spectrum, by varying the sampling interval according to the present invention.

FIG. 11 shows the time-dependence of the wavelength of a receiver mode due to the inventive modification.

FIG. 12 illustrates how the present invention integrates energy across successive wavelengths.

FIGS. 13 and 14 illustrate tidal creep on earth and on spacecraft, respectively, which can now be measured using the present invention.

DETAILED DESCRIPTION OF THE PREFERRED EMBODIMENT

The invention is described in detail below, beginning with graphical explanations of the notions of phase gradients and temporal parallax, and of the core principle of the inventive procedure, followed by specification of the preferred embodiment, description of its operation and sample calculations for selecting $\beta$. Application of the embodiment to receivers using resonant cavities and tuned circuits, diffraction gratings or refraction, and sampling and computation of the spectra is discussed in that order, showing how the inventive frequency shift z results in each case to reveal the target distance r, per equation (1). Lastly, practical considerations and implications to physics are briefly discussed, in order to ensure sufficient understanding of the invention to enable its utilization in diverse forms and applications by those skilled in the related arts.

A. Principle of the Invention

The principle of the invention is best illustrated by the graph in FIG. 1 showing how the phases of waves of different frequencies, $\omega_0, \omega_1, \ldots$, emitted by a target progress with the radial distance r from the target. The nodes [911] and the antinodes [912] of a low frequency $\omega_0$ have greater spatial separations than the nodes [913] and the antinodes [914] of a higher frequency, say $\omega_2$. The phase gradients mentioned in the Summary are slopes of the lines of constant phase connecting the waves, such as the lines [750] linking nodes, which form hyperbolas converging to r=0 at $\omega=\infty$. The wavefronts recorded and reproduced in holography are similar phase contours over space, instead of time as represented by the frequency domain.

The inventive principle is to modify a receiver so as to continuously scan the incoming frequencies. At a modification rate $d\hat{k}/dt>0$, the receiver then encounters an increasing phase contribution due to the path contribution kr, $k=\hat{k}$, which vanishes at r=0, and sweeps increasing shaded areas [700], [701] and [702] at increasing distances r from the source (target), as the path contribution is proportional to the slopes [750] of the phase contours. Measurement of these slopes, i.e. the phase gradients, thus reveals r in the form of a frequency shift $\delta\omega$ equal to the gradient $\partial\phi/\partial\hat{k}$ times the scan rate $d\hat{k}/dt$, per equation (5).

B. Relation to Temporal Parallax.

FIG. 2 illustrates the related notion of temporal parallax, which particularly explains the elimination of the need for a temporal, or phase, reference for the measurement of a target distance r in the present invention. The figure shows a plot of the inventive frequency shifts given by equation (1) for several values of $\beta$ for a point source initially at a first location [850] at distance r, and later at a second location [860] at r'>r.

According to equation (1), an incoming spectral distribution $F(\omega)$ [730] would appear shifted in frequency, under the inventive modification of rate $\beta_1$ (line [711]) to $F(\omega'_1)$ [731], and under a rate $\beta_2>\beta_1$ (line [712]) to around $\omega'_2$ [732]. Correspondingly, at rate $-\beta_1$ (line [721]), the distribution would be shifted to around $\omega''_1=\omega-(\omega'_1-\omega)=-\omega'_1$ [741].

It should be clear from the figure that by changing $\beta$, the receiver can effectively look at the target from different "frequency angles" $\alpha=\tan^{-1}\beta$, and thereby triangulate the target's location. For example, should the source move to the new location [860] at distance r'=r+$\delta$r, the same modification rate $\beta_2$ continues to subtend the same angle $\alpha_2$, but with respect to the new location [860], causing a further shift of spectrum to $\omega'_3=\omega'_2+\delta\omega$ [733].

C. Structure of the Preferred Embodiment

The preferred embodiment concerns a receiver of incoming electromagnetic, acoustic, gravitational or matter waves [900] from a target source or scatterer [800] comprising incoming frequency components $\{F(\omega)\}$, the receiver including a backend spectral analysis or detection means [220], and a frontend tuner or filter means [200] to receive the incoming waves at its input [100], such that the frontend influences the spectral selection at the backend. As shown in FIG. 3, the invention comprises

- a modifier means [400], to apply a controlled rate of change $d\hat{k}/dt$ to the frontend means [200], thereby producing a shifted spectrum $\{F(\hat{\omega})\}$ at the output of the frontend means [200], in turn causing shifts $\omega\rightarrow\hat{\omega}$ at one or more frequencies, or in a frequency band, selected by the backend means [220];
- a frequency shift detector means [300] to determine the inventive frequency shifts $\delta\omega$ from or within the output of the backend means [220];
- a distance computer means [320] to compute, as its output [120], the distance r to the target [800] using the output of the shift detector [300] and the instantaneous value of $d\hat{k}/dt$ being applied at each $\hat{k}$;
- an optional control means [420] to periodically reset the modifier [400] and the frontend means [200], or to periodically instruct the modifier [400] to invert the sign of the applied $\beta$, or to instruct varying of the instantaneous $d\hat{k}/dt$ to the modifier [400] according to a profile or in response to feedback;
- and an optional feedback path [450] from the distance computer means [320] to the modifier means [400] and to the control means [420] to regulate their operation.

To compare, in conventional spectrometry, care is usually taken to avoid, or to compensate for, any changes occurring in one's instruments during the course of an observation, and there is no room for distinguishing between frontend and backend frequency selections, simply because the object in prior art has never been to measure a frequency shift introduced by the observing instrument itself. For example, radio and television receivers include mixers that down-shift the incoming carrier to preset intermediate frequencies, and tuning elements that are selective of the latter, but the down-shift itself is not of interest.

Conversely, as the shifts are neither of predetermined magnitude nor made to preset frequencies, but are indicators of source (target) distances and produced within the receiver itself in the present invention, there is need for the first time to distinguish between frontend selection or tuning means to which the inventive modification is applied, and the backend selection or detection whence the resulting shifts can be determined.

In a telescope, for instance, the obvious frontend would be the objective lens or mirror, but the eyepiece lens could also be selected instead, for applying the inventive modification; in either case, the backend would be the observer's eye or a photodetector array as in most astronomical instruments today. Likewise, in a diffraction spectrometer, a grating or a set of slits would be likely candidates as the frontend means of the present invention, and the backend would be again a photodetector array or photographic film recording the spectrum. In a digital system performing digital Fourier transform (DFT), the DFT constitutes the backend and the frontend is the data sampling subsystem. Prior to the present invention, these systems would have been viewed as containing integral spectral analyzer units, indicated by the dotted line [210].

In a system involving a tuned frontend such as a resonant cavity or circuit, the backend detector or circuit ordinarily receives energy only in a narrow band around the frequency selected by the frontend. In this case, the backend is not usually designed to perform spectral analysis of its own, but to measure the amplitude or energy of the selected frequency. In this case, the inventive modification causes the amplitude or energy at $\omega=\hat{\omega}(1+r\beta/c)$ to get measured, instead of that at $\hat{\omega}$, by the backend, particularly illustrating the unusual separation between the selection and the measurement resulting in the present invention. Identification of the frequencies, for the subsequent determination of the frequency shift $\delta\omega \equiv (\omega-\hat{\omega})$, ultimately depends on the observation of distinct spectral patterns, usually amplitude or intensity, which is equivalent to power, and less likely, phase or polarization. Consequently, the measurement of single frequencies by tuned frontends does not limit the use of the invention.

Following general description of the operating procedure and sample calculations in the next two sections, a basic treatment of how the frequency shift $\delta\omega$ occurs in proportion to r is given for each major class of frontends. A detailed phase analysis of how the shifted frequencies manifest at the backend is given further ahead in the Supplementary Notes, subsection L-2.

D. Operation of the Preferred Embodiment

In a typical receiver, incoming waves [900] from the target [800] are fed by an input coupling means [100], such as an antenna, to the frontend means [200] directly or in an alternative form such as a voltage waveform. The backend means [220] extracts, at one or more frequencies $\hat{\omega}$, the complex valued Fourier coefficients $$F(\hat{\omega}) = \int_t e^{i\hat{\omega}t} f(t)dt, \text{ or, equivalently,} \quad (16)$$

$$\langle \hat{\omega} | f \rangle = \int_t \langle \hat{\omega} | t \rangle dt \langle t | f \rangle$$

based on the orthogonality relation, equations (9) and (11), respectively.

If the incoming radiation contained only a discrete set of the extracted components, it would be described, in reverse, by the Fourier series sum $$f(t) = (2\pi)^{-1} \sum_{\hat{\omega}} F(\hat{\omega}) e^{-i\hat{\omega}t} \text{ equivalent to} \quad (17)$$

$$\langle t | f \rangle = (2\pi)^{-1} \sum_{\hat{\omega}} \langle t | \hat{\omega} \rangle \langle \hat{\omega} | f \rangle.$$

In a large class of receivers to which the invention applies, the spectral means admits a continuous range of frequencies $\omega$, corresponding to the inverse Fourier transform $$f(t) = (2\pi)^{-1} \int_{\hat{\omega}} f(\hat{\omega}) e^{-i\hat{\omega}t} d\hat{\omega}, \text{ or} \quad (18)$$

$$\langle t | f \rangle = (2\pi)^{-1} \int_{\hat{\omega}} \langle t | \hat{\omega} \rangle d\omega \langle \hat{\omega} | f \rangle.$$

In traditional Fourier transform theory, the forward transform uses $e^{-i\omega t}$ and its inverse uses $e^{+i\omega t}$ as the kernel, but the traditional sign convention ignores the fact that the phase of an incoming wave decreases with time per equation (2). The reversal of kernels is thus necessary in the present context for linking travelling wave and Fourier theories, amounting to a simple, uniform reversal of signs of frequencies, and is valid, as the orthogonality conditions (equations 9 and 10) are symmetric with respect to this reversal.

This is the usual treatment in prior texts on signal processing, and completely ignores the path contribution $e^{ikr}$ in the phase of the incoming wave, equation (2), and thereby also the resulting phase gradient component $d\phi/dk$ (equation 14), which carries information of the target distance r. Using the orthogonality condition given by equations (9) and (11), which include the path contribution, the inverse transform becomes $$f(r,t) = (2\pi)^{-1} \int_{\hat{\omega}} e^{i(kr-\hat{\omega}t)} f(\hat{\omega}) d\hat{\omega}, \text{ or} \quad (19)$$

$$\langle t | f(r) \rangle = (2\pi)^{-1} \int_{\hat{\omega}} e^{ikr} \langle t | \hat{\omega} \rangle d\omega \langle \hat{\omega} | f \rangle,$$

where f( ) is the received signal waveform from a target at distance r. This path contribution plays a key role in holography, but is used separately at each k (or $\omega$) to compute the displacements $\Delta r$ between spatial features of the target, as explained. The disadvantage, as stated in the Summary, is that infinite wavelengths ($\lambda \rightarrow \infty$) would be needed to measure the full distance r to a target when the range is large or unknown.

The present invention concerns sweeping across the spectrum to measure the rate of change of this path contribution across the incoming spectrum, i.e. the spectral phase gradient $d\phi/dk$, defined by equation (14). More particularly, it involves converting the numerator $d\phi$ into a conveniently measurable form $\Delta\omega = d\phi/dt$, representing a frequency shift proportional to r per equation (5), by using a controlled sweep (or scan) rate $dk/dt = \dot{k}\beta$ (equation 7) for the denominator, where $\beta$ is the proportionality factor given by equation (1).

As will be illustrated by considering each of the broad physical classes of frontends, this procedure amounts to using k (more precisely, k̂ or ω̂≡k̂c) as a control parameter in measuring the spectrum, and distinct from the usual, naïve notion of k as simply $c^{-1} \times$ a received frequency ω. This indistinction was hitherto permissible as in absence of an uncorrected variation of k̂ during observation, corresponding to $\beta \equiv \hat{k}^{-1} d\hat{k}/d\hat{k}/dt = 0$, there is no frequency shift Δω, so that by the ordinary orthogonality condition, equations (9) and (11), we get ω̂=ω, corresponding to the traditional view of the spectral analyzers as integral functional units indicated by the dotted line [210] in FIG. 3.

However, k is routinely used to identify the standing wave modes of charge carriers and the lattice in solid state physics, as well as the modes of radiation in a cavity, as in Planck's theory. In this role, k̂(≡k) refers to the mode that selects the energy gathered from the incoming radiation signal, and is ordinarily, but not necessarily, the wave component contributing the gathered energy. By varying the receiving mode, k̂ would be varied at a nonzero rate dk̂/dt and the phase gradient exposed as δω=dφ/dt. This role of k≡k̂ would be especially clear in diffraction gratings, as the angle of diffraction depends on the wavelength $\lambda \equiv 2\pi/k$, which varies with the refractive index η of the surrounding medium as $\lambda = \eta \cdot 2\pi c/\omega$, rather than on ω.

The distinction has been unobvious in electronic circuit design theory and digital signal processing (DSP) because one ordinarily does not deal with wavelengths in these fields. The wavelength matters in the design of transmission lines in integrated circuits, and of wavelength-division multiplexing (WDM) data switches, the selection is invariably for static wavelengths during use. Continuously variable acousto-optic diffraction gratings are available, but their continuity merely refers to the very closely spaced static wavelength settings, and the transitions are necessarily discrete and discontinuous in time, requiring at least the transit time for one traversal of the acoustic waves across the device for a new wavelength to take effect. During transition, waves of the new wavelength would not have filled the spatial window of operation.

The present invention thus makes the first nontrivial use of k as a control variable by providing for a continuous change of k, as k̂, applied in the frontend means [200] by the modifier means [400], to yield a spectral shift δω according to equation (5) at each value of k̂;

optionally varying the shift δω using the control means [420] and an optional feedback [450] to facilitate detection and measurement of the shift;

detection of this shift δω in the output of the backend means [220] by the shift detector [300];

and computation of the distance r to the target [800] from the measured values of the detected shift δω and the applied rate of change dk̂/dt using equation (5).

It can be appreciated from equation (7) that in order to maintain a steady value of β for a useful observation interval of time T>0, the continuous variation of k̂, or ω̂, would have to be exponential, as $$\hat{\omega}(t) = \hat{\omega}(0)e^{\beta t} = \hat{\omega}(0)\left[1 + \beta t + \frac{(\beta t)^2}{2!} + \ldots\right] \text{ and} \quad (20)$$

$$\hat{k}(t) = \hat{k}(0)e^{\beta t} = \hat{k}(0)\left[1 + \beta t + \frac{(\beta t)^2}{2!} + \ldots\right], \quad t \in [0, T]. \quad (21)$$

Importantly, although the first two terms are quantitatively identical to the frequency scale factor (1+rβ/c) in equations (10), (12) and (13), the latter equations are in fact exact and not a first order approximation for an exponentially varied scale. Equations (20) specify the variation of the control variable k̂, or equivalently ω̂, required to maintain a steady value of β, whereas equations (10), (12) and (13) represent achieved shift in the received spectra due to the instantaneous value of β.

The difference means that any deviations from the exponential variation profile will make β unsteady, and cause flutter in the frequency shifts sufficient to make the target distance indication appear as noise. It also makes equation (20) pessimistic at optical and higher frequencies at which the individual photon transition times are very small because β needs to be kept steady during each photon absorption. As the instants of occurrence of the individual photon transitions cannot be predicted, it becomes important to maintain the profile throughout the exposure, or conversely, limit exposure to intervals during which the profile can be reliably maintained. At lower frequencies, photon energies are too small to be separately distinguished, but the same considerations of knowing or controlling β(t) precisely, and disabling reception or discarding data otherwise, remain identically applicable, and would be ensured via the optional control means [420] and the optional feedback means [450] in the preferred embodiment.

The frequency scale factor (1+rβ/c) introduced by the inventive modification is clearly independent of relativistic causes, such as falling in a gravitational potential well, which would yield a similar, continuous change of the receiver's frequency scale. However, as calculated in the manuscript gr-qc/0005014 mentioned in the Background, it would require falling steadily at 128.4 km/s in 1 g potential gradient to simulate the Hubble redshifts, i.e. for producing $\beta \approx 10^{-18}$ s$^{-1}$, let alone the immensely larger values necessary for use at terrestrial and near space scales. The scale factor in the present invention is mundane in this sense, and the effect would be limited to a "scaling zone" comprising the frontend [200] and the backend [220], demarcated by the dotted line [210].

E. Sample Design Calculations

As a practical design example, consider a laboratory scale measurement system, i.e. for measuring distances down to 1 m, with light, using a shift detector capable of measuring $z \approx 10^{-6}$. This calls for $$\beta \equiv \pm \frac{c \cdot z}{r} \approx \pm \frac{3 \times 10^8 \text{ ms}^{-1} \cdot 10^{-6}}{1 \text{ m}} = \pm 300 \text{ s}^{-1},$$

i.e. an initial value of k̂=$k_0$ must be increased to 300$k_0$ in the first second, $300^2 k_0$ in the next, and so on, or reduced to $k_0/300$ in the first second, $k_0/300^2$ in the next, etc. A one-directional sweep of the spectrum would cover the visible range, from 300 THz to 700 THz, which is barely over an octave, in 120 ms. Repetition at 20 kHz would permit a one-way variation window of 50 μs. Regardless of what fraction of this is discarded as "guard-time", the same total β of 300 must be achieved in 20,000 repetitions, so the variation per repetition interval would be $$\left.\frac{\Delta \hat{k}}{\hat{k}}\right|_{(1 \text{ m}, 20 \text{ kHz})} = 300^{1/20 \times 10^4} \approx 1.0003,$$

which is manageably small. The television frame rate of 50 Hz in much of the world would also suffice, as it would entail $$\left.\frac{\Delta \hat{k}}{\hat{k}}\right|_{(1\,\text{m},\,50\,\text{kHz})} = 300^{1/50} \approx 1.1208,$$

which would transform the helium-neon lasing wavelength of 632.8 nm to 565 or 709 nm, still in the visible range, depending on the sign of β.

Larger distances call for smaller β, which can be accommodated in various ways. For instance, retaining the 50 Hz repetition frequency, the modification rate may be continued for several periods before resetting or reversal. Alternatively, the backend spectrum analyzer [220] and shift detector [300] may be designed for the expected shifted frequency range, for example, for the visible band but paired with a frontend for microwaves. However, this conclusion would be premature, and the preceding example should really not be construed to imply that only small shifts would be available.

Rather, the discussion of the creep hypothesis in the Background illustrates that even a "geologically slow" rate of $\beta \approx 2.17 \times 10^{-18}$ s$^{-1}$ is sufficient for obtaining normalized shifts z of 6 and more at sufficiently large r. To verify, consider targets at 100 km, which is about the upper limit of the earth's atmosphere. Using 50 Hz repetition rate again, but with larger $z=10^{-3}$, the requisite β would be $$\left.\frac{\Delta \hat{k}}{\hat{k}}\right|_{(100\,\text{km},\,50\,\text{Hz})} \approx \left(\frac{3 \times 10^8 \text{ ms}^{-1} \cdot 10^{-3}}{100 \text{ km}}\right)^{1/50} = 3^{1/50} \approx 1.0222,$$

showing how the exponential characteristic, equation (20), also serves to make the invention scale from very small to very large distances. Instead, β needs to be precisely controlled, but since β is a control parameter, its precision can be achieved in several ways, including calibration against known targets, use of a feedback loop [450], and by choosing or varying the repetition frequency and designing for different normalized shifts.

F. Theory for Tuned Frontends

While it would be generally clear from the foregoing theory that the rate of change in the path contribution to the phase of an incoming wave would manifest as a frequency of magnitude δω, it remains to be shown that it would actually add to the incoming frequency, as assumed in equation (10) and its successors. Those equations further exhibited an effective change of either the spatial scale, as the path phase factor became $e^{ikr[1+r\beta/c]}$ or the temporal scale, as the frequency part alternatively changed to $e^{-i\omega t/[1+r\beta/c]}$, as a result of the modification, which also remains to be explained. The scaling is especially relevant in receivers using sampling and computation for extracting spectra, and will be revisited in that context. For now, the virtual motions of targets predicted by equation (15) will be also explained by the additivity of frequency shift.

FIG. 4 illustrates this new physics resulting from the inventive modification in a receiver using a resonant cavity [210] for frontend spectral selection, and a probe [222] leading to a backend circuit or subsystem for measuring a distinctive spectral property, such as an amplitude or intensity peak of an atomic spectral line, or the variation of the intensity across a band of frequencies to be successively selected at the frontend in the overall course of observation. The object is to measure the distance r to a target source [800] emitting (its own or scattered) radiation [900], as shown.

As illustrated in the figure, the cavity [210] is initially resonant at a wavelength $\lambda_0$ at time $t_0$. The standing wave pattern [910] of this fundamental mode is shown extended towards the target, to illustrate that the fundamental mode could be excited by a source of that frequency located around any of the antinodes [912], and would be unlikely to be excited if the source were at any of the nodes [911] lying in between the antinodes as shown. Excitation of the fundamental mode thus corresponds to detecting the presence of a source, but is ordinarily inadequate for determining the distance r to the source (target) [800] as r could correspond to any of an infinite number of antinode locations [912] spaced at increments of $\lambda_0/2$ from the cavity. It will be shown now that the inventive modification specified in the Summary for a resonant cavity, viz varying its length, suffices for eliminating this indeterminacy and determining r uniquely.

Consider the case when the modification comprises reducing the length of the cavity during the observation, as illustrated by the successive snapshots at times $t_1 = t_0 + \delta t_0$, $t_2 = t_1 + \delta t_1$, and $t_3 = t_2 + \delta t_2$ in the figure. As the length l of the cavity decreases, successively from $l_0 \equiv l(t_0)$ through $l_1 \equiv l(t_1)$, $l_2 \equiv l(t_2)$, $l_3 \equiv l(t_3)$, etc., the nodes and the antinodes move towards the cavity, to new locations [913] and [914] respectively at $t_3$, in proportion to their distances. The antinode nearest to the target [800] also moves towards the cavity.

Assuming that the only source of information available at the receiver of the target location [800] and its distance r is the excitation in the cavity, the receiver's representation of r will remain unchanged if and only if the target were moving as well just to maintain its phase relative to the changing instantaneous resonant mode of the cavity, i.e. moving closer to the receiver as shown by the successive "virtual positions" [810].

Conversely, with respect to the phase of the instantaneous fundamental mode of the cavity [210], a static target would appear to be receding by distances $\delta r_0$ over $\delta t_0$, $\delta r_1$ over $\delta t_1$, and $\delta r_2$ over $\delta t_2$, executing a virtual motion of velocity $\approx \delta r_i / \delta t_i$. One would expect a Doppler shift corresponding to this virtual motion, which would be additional to and superimposed over the "real" Doppler shift due to actual motion of the target [800], if any, relative to the receiver. The expectation bears out mathematically. The length of the cavity l is changed continuously (relative to the observer) at the rate $dl/dt = -\beta l$ (negative as l is decreased), since the instantaneous resonant wavelength $\hat{\lambda} = 2l$, so that $\hat{k}$ also changes at the rate $$\frac{d\hat{k}}{dt} = 2\pi \frac{d}{dt}\left(\frac{1}{\hat{\lambda}}\right) = -\frac{2\pi}{\hat{\lambda}^2}\frac{d\hat{\lambda}}{dt} = \frac{2\pi}{\hat{\lambda}}\beta = \hat{k}\beta \equiv \frac{\hat{\omega}\beta}{c} \quad (22)$$

where $\hat{\omega} = \hat{k}c$ is the instantaneous frequency of resonance, as required by equation (7). The rate of change of phase φ of the selected wave at the receiver is then $$\frac{d\phi}{dt} \equiv -\hat{\omega} = \frac{\partial \phi}{\partial t} + \frac{\partial \phi}{\partial r}\frac{dr}{dt} + \frac{\partial \phi}{\partial r'}\frac{dr'}{dt} + \frac{\partial \phi}{\partial k}\frac{d\hat{k}}{dt}, \quad (23)$$

where
the sign of $\hat{\omega}$ reflects the fact that the phase of an incoming wave would be decreasing per equation (2);
the first term on the right of equation (23) is the intrinsic rate of change of phase of the incoming wave that satisfies the selection, and is therefore $\partial(kr-\omega t)/\partial t = -\omega$;
the second term is the "real" Doppler effect due to relative motion (~dr/dt) if any between the target (source) and the receiver;
the third term is the Doppler effect due to the movement of the left end of the cavity, dr'/dt=-dl/dt;
and the fourth term accounts for the increasing phase encountered when the instantaneous selection k is increased, as explained in FIG. 1, with the first factor clearly representing the phase gradient, $$\frac{\partial \phi}{\partial k} \equiv \frac{\partial(kr-\omega t)}{\partial k} = r. \quad (24)$$

The third term would vanish if the right end of the cavity were to be moved instead, which seems to introduce some subjectivity. However, as δr'<<δr for target distances of practical interest, this term can be ignored altogether. The second term can be dropped as well without losing generality by considering only stationary targets, because the (real) Doppler contribution, if nonzero, can be determined and accounted for separately. This restriction also serves to isolate and distinguish the inventive frequency shift from the Doppler effect, which has similar strict proportionality to the frequency, but reveals relative velocity instead of distance.

On combining equations (22) and (24) into equation (23) and transposing, the remaining terms yield $$\omega = \hat{\omega} + \delta\omega, \text{ where } \delta\omega = \frac{\partial \phi}{\partial k}\frac{d\hat{k}}{dt} = \frac{\hat{\omega}\beta r}{c}.$$

As δω would thus be constant for fixed values of β, r and $\hat{\omega}$, there is only a pure shift, for each target, with no dispersion. As the wavevector of the incoming wave would be k=ω/c, the result is equivalent to $$\omega = \hat{\omega}\left(1 + \frac{r\beta}{c}\right) \text{ and } k = \hat{k}\left(1 + \frac{r\beta}{c}\right). \quad (25)$$

The result proves equation (10), establishing that the inventive frequency shift indeed adds to the incoming frequency, and is proportional to the latter. □

Equation (25) means that the incoming frequency ω actually selected by a changing resonator is not its (instantaneous) resonance frequency $\hat{\omega}$, but a proportionally larger or smaller value depending on the rate of change β, and the distance r to the source of the incoming radiation or signal, as previously explained with FIG. 3. This enables the measurement of r by controlling β according to the present invention (equation 1).

G. Theory for Diffractive and Refractive Frontends

FIG. 5 shows the same physics resulting from the inventive modification in a receiver employing a diffraction grating [230] for spectral analysis. Such a receiver typically includes an achromatic lens means [240] to focus the rays diffracted at an angle θ to a point corresponding to a in the focal plane [241] of the lens. By basic diffraction theory, θ depends on the grating interval l and the wavelength λ≡ω/2πc as $$n\lambda = l \sin \theta \quad (26)$$

where n is the order of diffraction. The focal plane is calibrated to read off the wavelengths λ, or equivalently, the frequencies ω corresponding to the diffraction angles. The object of the inventive modification is therefore to cause the focal points to shift for the wavelengths present in the incoming signal. The figure illustrates this intended effect, viz that every initially observed "image" spot [820] for frequency $\hat{\omega}$ should be shifted to a new image spot [830], corresponding to ω of equation (25).

As stated in the Summary, the modification in this case comprises varying the grating intervals at successive times. The figure explains the result of this variation. The shifted image [830] is still the sum of contributions from different portions of the grating, as in traditional Fourier diffraction theory. However, as the grating intervals l are made to shrink (or expand) continuously, at any instant t=$t_m$, the contributing ray [920] from one end of the grating would have emerged from the grating at an earlier time to when the grating interval was $l_0$=l($t_0$) [231], than a ray [930] just emerging from the other end, which would have faced a reduced grating interval [233] $l_m$=l($t_m$)<$l_0$. Note that although the grating intervals [231] and [233] seem to act concurrently from different regions of the grating, this desired effect cannot be achieved by spatial, static variation of the grating intervals, but can be obtained only by realizing these different interval values uniformly over the entire grating in a temporal sequence, as the inventive modification.

FIGS. 6 through 8 are three successive snapshots in time explaining this process. At time t=$t_0$, all of the grating intervals are of length [231] $l_0$, as shown in FIG. 6, and are uniformly shrunk to [232] $l_1$=l($t_1$)<$l_0$ at time $t_1$ shown in FIG. 7, and to a still smaller value [233] $l_2$=l($t_2$)<$l_1$ at time $t_2$ shown in FIG. 8. At the instant $t_1$, a wavefront along ray [920], which would have emerged from the grating at $t_0$, would be still "in flight", and would be joined by the wavefront of the second set of rays [921] just emerging (at $t_1$, FIG. 7), and still later by the wavefront of the third set of rays [922] emerging at $t_2$ (FIG. 8). All of these wavefronts must arrive in phase at the focal plane, in order to combine constructively to produce the shifted image spot [830]. The grating intervals [231], [232] and [233] thus concurrently contribute to each image spot, as depicted in FIG. 5, though they occur, uniformly, over the grating at different times.

The condition for constructive interference is that every incremental change of the intervals Δl must be consistent with the desired change Δλ corresponding to Δk of equation (5), which in turn is determined by intervals of time Δt according to the modification rate equation, (7). The corresponding rate equation for the controlled time-varying l, representing this condition, is obtained by simply dividing the time derivative of equation (26), $$n\frac{d\lambda}{dt} = \frac{dl}{dt}\sin\theta,$$

by equation (26) itself. The result, with our notation for indicating control variables, is $$\frac{1}{\hat{\lambda}}\frac{d\hat{\lambda}}{dt} = \frac{1}{\hat{l}}\frac{d\hat{l}}{dt} \equiv -\beta, \quad (27)$$

which is identical in form to the condition in equation (22), where l referred to the cavity length in FIG. 4.

As before, the other factor $\partial\phi/\partial k = r$ is independent of the modification. The inventive modification does not affect the spatial distance traversed by the individual rays from the grating [230] to the focal plane [241], nor the refractive index profile along their paths, notably at the lens [240]. The optical path lengths, defined by the path integrals of the refractive index, thus remain unmodified from conventional Fourier spectroscopy, where they are known to be equal. Thus, though different wavelengths get summed at the focal spot [830], this incremental distance, resembling r' in equation (23), is constant, and its derivative is 0. The third term in equation (23) thus vanishes altogether, making the achieved frequency-distance relation even more exact than for cavity receivers.

The main difference in a receiver using refraction is that refraction involves a continuum of multiple paths. The same phase relations hold nevertheless and the results would be identical. An important consideration in both cases is the realization of continuous variation of the grating interval or the refractive index, respectively, uniformly over the spatial aperture. This rules out acousto-optic cells, as explained in the Background, but other means should be possible, such as by projection of a grating pattern on a photorefractive medium.

H. Application to Tuned Circuits

It would be apparent to those skilled in electronics that the preceding derivation for a resonant cavity can be almost identically applied to a tuned circuit used to select an incoming frequency, and that the inventive modification would then comprise varying a tuning element in the circuit in place of the cavity length.

FIG. 9 shows the tuning section of a receiver using a "tank circuit" comprising an inductor [250] of value L (typically in milli- or micro-henries) and a capacitor [251] of value C (typically in micro- or pico-farads) connected as a first stage filter the receiving antenna [130] as shown. Spectral selectivity is achieved because the inductor [250] shorts low frequencies, including d.c., to the ground, while the capacitor [251] shorts high frequencies to the ground, and the combination presents the maximum impedance between the antenna [130] and the ground at the resonant frequency $\hat{\omega}$ given by the well known formula $$\hat{\omega}^2 = \frac{1}{LC}, \text{ whence} \quad (28)$$

$$\frac{d\hat{\omega}}{dt} = \frac{(LC)^{-3/2}}{2} \cdot \frac{d(LC)}{dt} \text{ and } \frac{1}{\hat{\omega}}\frac{d\hat{\omega}}{dt} = \frac{1}{2(LC)^2} \cdot \frac{d(LC)}{dt}.$$

For the inventive modification, equation (22) may be transposed to $$\frac{cd\hat{k}}{dt} \equiv \frac{d\hat{\omega}}{dt} = -\hat{\omega}\beta \text{ so that } \beta = -\frac{1}{\hat{\omega}}\frac{d\hat{\omega}}{dt}, \quad (29)$$

which yields $$\frac{d(LC)}{dt} = -2\beta(LC)^2 \quad (30)$$

as the rate of change of L or C or both needed to achieve the inventive modification rate β. The resulting rate of change of phase at the output [140] of the tank circuit is again given by equation (25), which inherits the dependence on the source distance r from equation (24).

The tuned circuit with the inventive modification could be employed, for instance, in the radio receivers of police, coast guard and other emergency services, enabling them to home in on distress calls accurately even without triangulation or radar support. Another application is transparent monitoring of transmission lines and optical fibres, as explained in the Summary. An alternative digital approach is described next.

I. Application to Time-Domain Sampling

As the spectral selectivity is driven by spatial geometry in cavity and diffraction based receivers, in the form of the lengths of the cavity and of the grating intervals, respectively, the inventive modification comprised varying these lengths exponentially per equation (20) in these cases. The analogous modification for a tuned circuit lay in similarly modifying one or more of its tuning elements. At lower frequencies and with sound, however, it is now more common to use sampling and digital filtering or computation of the spectrum. The only frontend tuning element is the "sampling clock", and it follows intuitively that this must be somehow subjected to a controlled modification for once again obtaining the frequency shifts of equation (5).

A rigorous derivation follows directly from the inventive principle, viz that the inventive modification is required to vary the receiver's selection of $\hat{k}$ continuously, so as to scan the phase gradient ([750], FIG. 1). As remarked in the Summary, the scale of k is determined by the calibration of the sampling interval T, and can be varied by changing T without correcting for the induced phase changes in the computation. Spectral analysis in such systems generally involves blocks of samples using the discrete Fourier transform (DFT)

$$F(m\omega_T) = \sum_{n=0}^{N-1} e^{im\omega_T T} f(nT),$$

with the inversion:

$$f(nT) = \frac{1}{N}\sum_{m=0}^{N-1} e^{im\omega_T T} F(m\omega_T), \quad (31)$$

where T is the sampling interval, N is the number of samples in each block, and $\omega_T = 2\pi/NT$. The inversion involves the orthogonality condition $$\sum_{n=0}^{N-1} e^{im\omega_T T} e^{i(kr-n\omega_T T)} = \sum_{n=0}^{N-1} e^{ikr} e^{i(m-n)\omega_T T} \qquad (32)$$

$$= \frac{1-e^{i(m-n)}}{1-e^{i(m-n)/N}} = N\delta_{mn},$$

where $\delta_{mn}$ is the Kronecker delta, of value 1 if m=n and 0 otherwise. These equations clearly show that the frequency selections $\hat{\omega}_T = \hat{k}c$ can indeed be varied at least statically, i.e. between observations, by changing the sampling interval T. It remains to be proved that a controlled change of T during observation will indeed reproduce the inventive frequency shifts $\delta\omega$ of equation (5).

For this purpose, consider again the phase derivative equation (23). The real Doppler term, involving the relative velocity dr/dt if any, is not relevant, once again, and can be safely ignored. The remaining Doppler term, concerning local movements dr'/dt can be ignored as well for the same reason as before, viz that r'<<r for targets of practical interest. The surviving terms are then $$\frac{d\phi}{dt} \equiv -\hat{\omega} = \frac{\partial\phi}{\partial t} + \frac{\partial\phi}{\partial k}\frac{d\hat{k}}{dt},$$

where $\partial\phi/\partial t = -\omega$, as before, and $$\frac{d\hat{k}}{dt} = \frac{1}{c}\frac{d\hat{\omega}_T}{dt} = \frac{1}{c}\frac{d}{dt}\left(\frac{2\pi}{NT}\right) = -\frac{2\pi}{NcT^2}\frac{dT}{dt} = -\hat{k}\frac{1}{T}\frac{dT}{dt},$$

so that, corresponding to equation (7), we get $$\frac{1}{\hat{k}}\frac{d\hat{k}}{dt} \equiv \beta = -\frac{1}{T}\frac{dT}{dt}. \qquad (33)$$

Since equation (24) still holds for the phase gradient factor $\partial\phi/\partial t$, the net result is again equation (25), but with $\beta$ defined in terms of T according to equation (33). □

FIG. 10 illustrates how the phase gradient gets exposed by varying the sampling interval T. As clear from the figure, an incoming sinusoid [940] of constant wavelength $\lambda$ will be perceived at increasing phase shifts [262] $\delta\phi_1$, $\delta\phi_2$, $\delta\phi_3$, . . . in the successive samples obtained at the diminishing intervals [260] $\delta T_1 = T_1 - T_0$, $\delta T_2 = T_2 - T_1$, $\delta T_3 = T_3 - T_2$, etc.

From the relation $\hat{\omega}_T = \hat{k}c = 2\pi/NT$, the phase gradient can be quantified as $$\frac{\partial\phi}{\partial T} = \frac{\partial\phi}{\partial\hat{k}}\frac{d\hat{k}}{dT} = -\frac{2\pi}{NcT^2}\frac{\partial\phi}{\partial\hat{k}}$$

so that this increasing phase difference is equal to $$\frac{\partial\phi}{\partial T}\frac{dT}{dt} = -\frac{2\pi}{NcT}\frac{\partial\phi}{\partial\hat{k}}\cdot\frac{1}{T}\frac{dT}{dt} \qquad (34)$$

$$= \frac{\hat{\omega}_T}{c}\frac{\partial\phi}{\partial\hat{k}}\cdot\frac{1}{\hat{k}}\frac{d\hat{k}}{dt} = \frac{\partial\phi}{\partial\hat{k}}\frac{d\hat{k}}{dt} \text{ identically,}$$

using equation (33). Equation (34) establishes that this increasing phase difference is in fact the same as that seen by a resonant cavity, as in FIG. 4, subjected to similar inventive modification of its length.

An important variation possible with a sampling receiver is simulation of the variable time sampling from uniformly sampled data by interpolation, approximating the input amplitude $f(T_1)$ from the measured values $f(T_0)$, $f(2T_0)$ and possibly $f(3T_0)$, etc. depending on the interpolation algorithm used. For example, simple linear approximation means taking $$f(T_1) = f(T_0) + [f(2T_0) - f(T_0)][T_1/T_0 - 1],$$

and its simple implementation would need to first identify, at each n>1, the correct pair of neighbouring samples to use for the approximation. For instance, the approximations for $f(T_3)$, $f(T_4)$ and $f(T_5)$ would all depend on the measured values $f(3T_0)$ and $f(4T_0)$. Clearly, only lower frequencies of the spectrum will be faithfully scaled by this procedure and will be usable for the distance computation, while the higher parts of the spectrum will appear distorted. Preliminary experiments with simple acoustic recordings at 8 kHz sampling clock and simple linear interpolation have shown well identifiable spectral shifts up to 500 Hz.

J. Practical Constraints

While the theory and calculations above would generally suffice for those skilled in the related arts to realize the present invention to various kinds of receiver frontends, several practical constraints have been explained in the Background as causes that had held off discovery of the invention, and must be kept in mind in the design of an implementation. Notably, unless the observation time window within each repetition interval is kept short, an implementation would need to take special care to ensure that the variation of $\hat{k}$ is exponential, to correspond to a steady $\beta$, say using the feedback [450], or, conversely, to compensate for variations in $\beta$ by including the value of $\beta$ in the computation stage [320]. Another option is to use a known target in the same field of view as reference for the instantaneous distance scale in the computation. Another constraint mentioned concerned the prevalence of tunable mechanisms that lock on to specific frequencies or selections, including PLLs, masers and acousto-optic cells—such devices, though variable in the ordinary sense, would be unusable for the present invention, and alternative arrangements, such as gratings on photorefractive or piezoelectric materials, which can be uniformly varied, are needed.

These constraints are clearly not prohibitive and are merely new requirements arising from the novelty of the inventive approach.

K. Scope of the Invention

Although the invention has been described with reference to the preferred embodiment, it will be appreciated by one of ordinary skill in the arts of physics, electronics and radar technologies that numerous modifications and variations are possible in the light of the above disclosure. For example, the inventive method could be conceivably applied to de Broglie waves, such as in an atomic microscope, or to seismic waves in geology, as an alternative or supplement to triangulation. Another variation is to use a prism instead of a diffraction grating, the inventive modification being then applied by mechanical compression. Another variation, related to the resonant cavity and the tuning circuit frontends, is to use a tuned delay line as frontend, the inventive modification then consisting of varying the length of the delay line analogously to the length of the cavity. Yet another variation is to apply the inventive principle in reverse to determine extremely small creep rates under inertial, electromagnetic or tidal stresses, by measuring the frequency shifts for known targets resulting from the creep.

With many kinds of frontends and for some applications, it may be necessary to generalize the given theory to deal with anisotropic variations of the wavevector k, which has been treated as scalar for simplicity of the description; polarization; and refractive index effects, which could be anistropic as well as nonlinear. Such generalizations are, however, expected to be mundane and straightforward.

Likewise, use of the present invention for separating multiple targets according to range, and related use for source-distance multiplexing, or better frequency reuse, in communication would be obvious to those skilled in the related arts.

All of these modifications, generalizations and variations are intended within the scope and spirit of the invention as defined in the claims appended hereto.

L. Supplementary Notes

These notes are intended for deeper understanding and additional insight into the physics of the invention.

As such, they include a brief discussion of complementary, unpublished work of fundamental nature, notably, a rigorous classical derivation of the quantum postulates, the tidal damage model for the creep hypothesis described in the Background, and reverse application of the invention to the latter.

L-1 Fundamental Principles of Radiation Physics.

The present invention makes novel use of four basic observations regarding the physics of radiation:

A. The Phase Velocity c of a Spectral Component is Independent of the Spectral Decomposition.

This result follows directly from the wave equation, as applied to the radial distance r from the source, $$\left[\frac{\partial^2}{\partial r^2} - \frac{1}{c^2}\frac{\partial^2}{\partial t^2}\right]f(r,t) = 0, \tag{35}$$

which permits general solutions of the form f (r±ct) with arbitrary shapes f. Spectral decompositions are defined by choosing additional invariants, such as translational invariance under the operator $$d_\alpha: f(t) \rightarrow f(t-\alpha), \; d_\alpha f = \alpha f \tag{36}$$

where $\alpha \equiv \pm i\omega \in Z$, the complex plane. This invariance leads to the Fourier eigenfunctions $$f = e^{\pm \alpha t} \equiv e^{\pm(\sigma \pm i\omega)t}, \tag{37}$$

where ω quantifies frequency and σ, the rate of growth or decay of these waves. This is the ordinary Fourier spectral decomposition used in current radars, and the basis for the notion of frequency scales in wavelet theory, as remarked in the Background. Its only distance-dependent property is the propagation delay t=r/c, representing the path contribution in the instantaneous phase, as the sinusoidal form extends uniformly to infinity. Distance dependence is therefore required via a second property, in order to eliminate temporal reference, and is available, for instance, in the amplitude.

However, except for the "standard candles" of astrophysics, the source intensity is not generally known a priori, and path attenuation is generally not negligible and difficult to determine independently. For these reasons, a distance dependence must be instead sought in the frequency.

B. The Choice of the Received Spectral Decomposition Rests Entirely with the Receiver.

This is obvious at long wavelengths at which the signal can be digitally sampled and the selection of the invariance operator is up to the receiver. However, as remarked, prior theory has been almost exclusively concerned with static frequency selections, wavelet analysis being concerned with the frequency scales of the source, so that the receiver-side choice of decomposition has been generally unobvious.

A decomposition sensitive to r, or equivalently the path delay t, would require a variation of scale at the receiver or a fundamental cooperation from the rest of the universe, as will be discussed with regard to astrophysics further below. The present invention concerns decomposition with a varying scale property in addition to the translational invariance in equation (36), viz the scaling translational invariance $$d_{(a,\alpha)}: f(t) \rightarrow f(t/a-\alpha), \; d_{(a,\alpha)}f = \alpha f \tag{38}$$

visible in equation (33). Recursive applications of $d_{(a,\alpha)}$ compound with respect to the scale of t, leading to the exponential variation $$\beta = \frac{1}{a}\frac{da}{dt} \text{ or } a(t) = a_0 e^{\beta t}. \tag{39}$$

This exponential variation is, however, simply the inventive means for scanning the phase gradient at the steady normalized rate β, and the observed frequency shifts are due to the phase gradient ~∂φ/∂k, which is linear in β and r, rather than the scale ratio a(t), which concerns the changing selection dk/dt, per equation (34).

Further, as remarked, attempts to vary a receiver's spatial or temporal scale statically merely lead to a change of its calibration, without achieving the distance-dependence sought in equation (1), and this partly accounts for the apparent rigidity of the quantum scale.

C. The Physical States of a Receiver that Interact with Radiation Cannot be Perfectly Stationary.

The stationarity of spectrometric states is a requisite in both classical spectral analysis and the quantum formalism of states, and steps are taken, where accuracy is called for, to stabilize spectrometers against thermal variations or noise. However, these corrective mechanisms only suffice to address the third term contributions in equation (23), ∂φ/∂r'·dr'/dt. The phase gradient contribution, which is proportional to the full source distance r and therefore unbounded, was unrecognized. The problem is that any spectral measurement by definition involves macroscopic properties of instruments like the cavity length and the grating interval, denoted by l in above theory, whose perfect stationarity, even relative to the observer, fundamentally cannot be guaranteed. The quantum equations of dislocations and creep do not provide a nonzero threshold of stress below which creep cannot occur.

For example, the creep hypothesis mentioned in the Background concerns a d.c. component of relative variation of telescope dimensions at only $10^{-18}$ s$^{-1}$, over an order slower than even plate tectonics, but this would more than suffice to account for the observed cosmological expansion and acceleration. No symptoms are locally observable on or near earth because at this range, equation (12) reduces to $$\lim_{r \to 0} \left\langle \hat{\omega}, \frac{d\hat{\omega}}{dt} \bigg| \omega, r \right\rangle = \lim_{r \to 0} \delta \left( \hat{\omega} \left[ 1 + \frac{r\beta}{c} \right] - \omega \right) \quad (40)$$
$$= \delta(\hat{\omega} - \omega) = \langle \hat{\omega} | \omega \rangle,$$

thus lulling us into blissful confidence in the perfectness of the quantum scale! The invention concerns a much larger rate of variation, as explained, exploiting the following result.

Theorem 1 (Source distance information) A sufficient condition for determining the distance to a distant source from its band-limited signal is that the output of the receiver be derived from a continuum of wave periods of different wavelengths in the signal.

Proof. Equation (4) implies, as mentioned following equation (4), that for $r \to \infty$, we need $\Delta k \to 0$ in order to keep the phase difference $\Delta \phi$ finite and constant. In the limit, therefore, we need to effectively compare phases between frequencies that are infinitesimally apart. It might seem somewhat ironic that it is for nearby targets that we would need a large bandwidth. □

D. Any Radiation from a Real Source has Nonzero Fourier Spectral Spread and More Particularly, the Fourier Components will have Phases Consistent with Their Common Source Location.

This addresses a crucial requirement, that the target emit at least two frequencies from which a distance-dependent difference of phase can be obtained, though they do not need to be accurately separated.

The observation follows partly from definition, since a pure sinusoid, expressible as $\exp[ikr \pm i\omega t + i\phi(\omega)]$, where $\phi$ denotes a phase offset, cannot have a finite beginning or end. The consistency of phases between adjacent frequencies follows as every wavepacket must contain differentially separated frequencies that started with the same phase at the source.

The observation is supported by empirical verifications of the geometrical theory of diffraction (GTD) at radar wavelengths (and with sound), as mentioned in the Background. At optical wavelengths, the consistency applies to individual photons, and appears to be validated at least for very small $\beta$ by the Hubble redshifts, according to the creep hypothesis (see Background).

Observation (A) provides a necessary connection and the distance-frequency relation. Observation (B) is of course the basis for capturing the relation, which is done in a manner involving time only in derivatives so as to eliminate the traditional need for a time or phase reference.

The significance of Observations (C) and (D) will become especially clear from the following subsections.

L-2 Detailed Phase Analysis

At first sight, the theory for the resonant cavity seems to implicitly assume that the incoming radiation [900] from the target can excite a standing wave mode of the cavity even as this mode changes. This cannot make sense as true resonance would be impossible and there is no room, apparently, for a build up of energy in a shared oscillatory mode. Likewise, equation (25) literally says that a single incoming frequency $\omega/(1+r\beta/c)$ should strike resonance with the cavity while it is being changed as specified, whereas ordinarily, it would take the higher frequency $\omega$ to cause the same excitation. These partial conclusions would also contradict the principle of the invention, stated in the Summary, that it concerns scanning of the phase gradient, $\partial \phi / \partial \bar{k}$, across the incoming spectrum, as well as the clear representation of this principle by the factor $d\bar{k}/dt$ that multiplies the gradient in equation (23), which was applied to each class of receiver frontends.

The proper interpretation, consistent with both equations and the principle, is that during the inventive modification, the cavity modes are instantaneously of a time-varying form, as shown in FIG. 11, and satisfy the scaled translation invariance of equation (38), but the shifted frequencies arise from the phase differences between such a mode and the incoming waves as a phase difference wave. This difference wave is primarily seen by a subsequent stage of the receiver, identified as the backend means [220] in the preferred embodiment, FIG. 3 fed by the probe [222], so that the frontend resonator acts only as a filter, not as the final detector. This might be clearer with the modified diffraction grating of FIG. 5, where photon detectors would be placed in the focal plane [241], and with the modified shunt tank circuit shown in FIG. 9, where the difference signal would form the output. The remaining questions, do the time-varying modes get excited at all and how the difference signal is physically generated, are explained next.

FIG. 11 illustrates the time-varying resonant mode of the cavity [210] of FIG. 4. The resonance wavelength changes, as in the prior figure, from $\lambda_0$ to $\lambda_1$, $\lambda_2$, and so on, at the successive times $t_0$, $t_1$, $t_2$, etc. If we string these successive wavelengths, we get the time-varying waveform [950] as it arrives at the cavity, though this is really an approximation, as the wavelength changes gradually and not discretely at the successive nodes. The figure also suffices for understanding how the phase difference signal gets generated. We would expect an incoming wavefront of wavelength $\lambda_0$ at to $t_0$ be reflected back by the far end of the cavity [210], to meet the incoming radiation at the left end after an interval $\delta t_0 = l_0/\lambda_0$, i.e. after a delay of exactly $2\pi$ in phase. At this instant, the resonance wavelength would have reduced to $\lambda_1$, which is the next wavelength reflected back, also with exactly $2\pi$ phase lag after the next interval of $\delta t_1 = l_1/\lambda_1$, regardless of its initial phase.

Each time, the reflected wave serves as the phase reference for the next wavefront, but only at successively decreasing wavelengths, unlike an unmodified resonator, accumulating the phases of successive wavelengths. This phase buildup would be proportional to the distance, and the rate of change of wavelength selection, as shown by FIG. 1, and adds to the instantaneous selection according to equation (25). The instantaneous resonant mode of the cavity is also thus continuously activated, but as remarked, the cavity is not the final detector but a filter. In the tank circuit of FIG. 9, which would act similarly, all but the instantaneous shifted frequency $\hat{\omega}$ get shorted to the ground.

The foregoing analysis also shows that each shifted frequency does represent energy collected from across incoming frequencies. FIG. 12 illustrates this recombination of photon energies. In absence of the inventive modification, all the observed photon transitions at a given wavevector $k_0 \equiv \omega'_0/c$ involve contributions [760] from the same incoming frequency $\omega_0 = \omega'_0$, corresponding to the $\beta=0$ line [710]. Contributions [761] at $k=k_1$ and contributions [762] at $k=k_2$ add to observed photons only at the modal frequencies $\omega'_1 = k_1 c$ and $\omega'_2 = k_2 c$, respectively. The photon counts follow the intensity profile [730] of these contributions.

Under the inventive modification, these contributions no longer add to only their respective frequencies, but are spread out, as suggested by the inclination of the $\beta>0$ line [715]—there would be more spreading at larger magnitudes $|\beta|$. Incoming waves at $k=k_0$ will now contribute a little at every $k \in (k_0-\delta k, k_0+\delta k)$, where $2\delta k$ corresponds to $\beta$ times the photon collection/transition time $\delta t$. This interval would include the neighbouring modes $k_1$ and $k_2$ if close enough. At optical and higher frequencies, as the photon transition times would be very small relative to the inventive modification rate, no reduction of target brightness would be expected because of this spectrally distributed collection of energy.

L-3 Gap in Prior Quantum Theory

The present invention and its theory fill a basic gap in the quantum theory, as follows. In quantum mechanics, the result of observing incoming radiation of unknown state $|\psi\rangle$ is defined to be one or more stationary states ($\phi|$ of the receiver occurring with respective probability amplitudes $(\phi|\psi)$ (see, for example, §6 and §10 of P. A. M. Dirac's *The Principles of Quantum Mechanics*, Oxford, 4th edition, 1958). However, the stationarity is impossible to guarantee because the states are necessarily macroscopic in order to be representative of the measured information, and because of the following theorem based on the present invention and theory:

Theorem 2 (Impossibility of stationarity) No physical state can be made perfectly stationary with finite measurements of finite resolution.

Proof. If $\epsilon$ is the smallest measureable value of z and $\rho$, the maximum range of observation, the smallest verifiable value for $\beta$ is h such that $$\beta \geq h = \frac{c\epsilon}{\rho} > 0, \quad \text{since } \rho < \infty \text{ and } \epsilon > 0,$$

from equation (1). □

The gap is that there is no formal support in existing quantum theory for dealing with this nonstationarity. A different kind of spectral line broadening is ordinarily considered, viz due to thermal motions of the cavity walls, but this only caters to essentially "a.c." fluctuations with a zero mean static value.

L-4 Particle Wavefunctions in Cosmology

The time-varying eigenfunction [950] of FIG. 11 is mathematically represented by $$f(r, t) = \exp\left[ikr \pm \frac{i\omega t}{a(t)}\right] \sim H \big| \omega, r \big\rangle \text{ of equation (13)}, \tag{41}$$

where t denotes the local time at the receiver, and the scale factor $a(t) \sim 1+r\beta/c \equiv 1+\beta r$, where r is the total path time.

Eigenfunctions of the form of equation (41) were first described by L. Parker in the paper titled "Quantized fields and particle creation in expanding universe", *Physical Reviews*, volume 183, number 5, pages 1057–1068, 25 Jul. 1969. In Parker's application, $\beta$ refers to the Hubble expansion rate, the scale factor a, to the Friedmann-Robertson-Walker (FRW) metric, and the time-scale evolution in equations (39) and (41) to the cosmological time dilation (CTD) relative to our clocks. The scale variation a(t) equivalently concerns the receiver's spatial scale of distances, since $$f(r, t) \equiv \exp[ikr \cdot a(r/c) \pm i\omega t] \equiv \exp[ikr \cdot a(r) \pm i\omega t] \tag{42}$$

to within a multiplicative constant. In addition, the existing cosmology theory takes a more simplistic view in attributing the Hubble redshifts to an actual, fundamental difference of scale between the time of origin of the photons and their reception today. The growth of this scale is described, among other possible models, by the exponential evolution of equation (39), which makes the relation between the redshifts and the source distances much more complex than in the present invention, and nonlinear.

In the present invention, this relation is strictly linear and depends only on the instantaneous value of $\beta$, as given by equation (5). This instantaneous linearity also reproduces the cosmological acceleration, since a source receding at velocity v at distance r would be expected, $\beta$ remaining constant, to be receding at 2v by the time it reaches 2r. From equation (15), writing H for $\beta$, we would thus have $$\begin{aligned}\ddot{r} &\equiv \frac{dv_v}{dt} \\ &\equiv -\frac{d(Hr)}{dt} \\ &= -H\frac{dr}{dt} - r\frac{dH}{dt} \\ &= -H^2 r - r\frac{dH}{dt} \\ &\equiv -H^2 r - r\dot{H},\end{aligned} \tag{43}$$

whence the corresponding "deceleration coefficient", from relativistic cosmology theory, emerges as $$q \stackrel{\Delta}{=} \frac{-1 + \dot{H}/H^2}{\alpha} \equiv -1 + \dot{H}/H^2 = -1 \text{ identically}, \tag{44}$$

as a refers to the observer's current local scale and is 1 identically at all times even when $\dot{a}$ is nonzero!

This is exactly the deceleration coefficient found for every one of hundreds of Type IA supernova observed since 1998, as first reported by A. Reiss et al. in "Observational Evidence from Supernovae for an Accelerating Universe and a Cosmological Constant", *Astronomical Journal*, 1998. The "quietness" of the Hubble flow would therefore be perfectly explained if the cosmological expansion were simply virtual, due to a previously unsuspected ongoing change in our instruments, exactly like the inventive modification, but of magnitude given by $\beta \sim H_0 \approx 67$ km s$^{-1}$ Mpc$^{-1} \approx 2.17 \times 10^{-18}$ s$^{-1}$. This would exactly account for the (residual) Pioneer anomalous accelerations, resolve a slight discrepancy between the satellite-based and ground-based measurements of oceanic tidal friction coefficients, and solve an old mystery of paleontological and geological data indicating a past expansion of the earth (summarized in "The implications for geophysics of modern cosmologies in which G is variable", by P. S. Wesson in *Quarterly Journal of the Royal Astronomical Society*, pages 9–64, 1973; Wesson has privately communicated that the problem got abandoned following the untimely death of the leading investigator.) The result seems to also neatly explain the "flatness" of the universe, which is simply that the dark matter indicated by the rotation profiles of galaxies is consistent with a Coriolis-like acceleration under a Euclidean (flat space) cosmological expansion, as stated in the Background: the virtual expansion is precisely flat and Euclidean.

In hindsight, neither of equations (41) and (42) did actually ever suffice to imply a static difference of scale between the receiver and the incoming waves, as hitherto assumed in cosmology. No other explanation was previously possible as no alternative to the Doppler effect was known that would both preserve the ratios of atomic spectral lines and provide unlimited normalized shifts. A static difference of scale is responsible for gravitational redshift, but has the upper bound of z<2 (see, for instance, R. M. Wald's *General Relativity*, University of Chicago Press, 1984, page 138).

The preservation of the atomic line ratios was hitherto known only for the Doppler effect, but by equation (25), any pair of spectral lines $\omega_a$ and $\omega_b$ emitted jointly by the same source would be both scaled by the same factor $1+r\beta/c \sim 1+rH/c$, so that the shifted frequencies retain the geometrical relation $\omega'_a/\omega'_b = \omega_a/\omega_b$. Atomic and nuclear spectra are thus exactly preserved. The emission spectrum of a hydrogen-like atom, for example, is given by the Balmer-Rydberg series formula $$\omega_{n,m} = 2\pi Z^2 R \left\{ \frac{1}{n^2} - \frac{1}{m^2} \right\}, \quad R = \frac{m_e q_e^4}{8\epsilon_0^2 h^3} \text{ (SI units)}, \tag{45}$$

where $m_e$ and $q_e$ denote the electronic mass and charge, respectively, and $\epsilon_0$ is the permittivity of vacuum. It is trivial to verify that all resulting ratios are invariant under the inventive modification.

L-5 Consistency of Space Telescopes

The consistency in the value of $H_0$ obtained from earth orbiting telescopes with ground-based techniques, which is one of the main difficulties for the creep hypothesis as mentioned in the Background, is explained by the calibration procedure for the only instrument suitable for observing objects beyond 750 million light-years on the Hubble telescope, the Near Infrared Camera and Multi-Object Spectrometer (NICMOS).

According to the handbook (see http://ww.stsci.edu/hst/nicmos/documents/handbooks), the grism (grating+prism) mode wavelength calibrations were performed by observing, in orbit, planetary nebulae Vy 2—2 and HB 12, while the inverse sensitivity curves were obtained by observing the white dwarf G191-B2B and G-dwarf P330E. In other words, this spectrometer is recalibrated while in orbit without ground based or ground-supplied physical referents, i.e. without using say a ground laser of known frequency with requisite gravitational redshift correction, or an onboard source of known spectrum. The calibrating observations are for sources at nontrivial astronomical distances, corresponding to source states $|\omega, r\rangle$ and the shifted spectra of equation (12), in which r and H had been obtained from ground-based data so that $\omega$ could be calibrated from the observed shifted frequencies $\hat{\omega}$. By the principle of the invention, equation (5), as applied in the creep hypothesis, the cause of the redshifts is independent of the incoming waves and their spectrum, hence by not using a local (i.e. ground or onboard) physical referent of wavelength, the procedure directly transfers the ground-determined $H_0$ to the space-based observations! In prior physics, there had been no reason to expect any difference in redshifts between ground and nearby space. Onboard lamps are used for calibrating another of Hubble's instruments, the Space Telescope Imaging Spectroscope (STIS), but this is only useful for very low z objects.

Differences in the construction of ground telescopes and techniques would be expected to cause systematic variations in the estimates of $H_0$ between observatories, and such systematic differences have occurred between research groups. The quantum properties of solids would allow differences of up to an order in the creep rates, but the "frontend materials" would be unlikely to differ as much, as their choice is dictated by common requirements of strength, lightness and thermal stability. This too seems consistent with the continued convergence in the value of $H_0$.

Similarly consistent values of $H_0$ are also reported from non-telescopic space observations, notably those of WMAP orbiting around the earth's "L2" Lagrangian point, where the lunar tidal forces would be very different from those on and nearer to earth. The instruments themselves, and their use and calibration, are very different from those of ground and orbiting telescopes. In this case, the factor leading to an ostensibly measured value of $H_0$ is the nonlinearity of the cosmological expansion according to the standard model and inflation theory, corresponding to $dH/dt \neq 0$ in equations (43) and (44). More particularly, the magnitude of $H_0$ intimately depends, in this prevailing view, on the anisotropy of the microwave background. As the expansion itself purely virtual in the creep hypothesis, the anisotropy is per se expected for want of an initial singularity, and the back-computation of $H_0$ from the measured anisotropy in the WMAP project are merely another illustration of self-fulfilling prophecy.

L-6 Tidal Damage Model and its Determination

As briefly introduced in the Background, the tidal creep hypothesis is an illustrative example of the inventive mechanism. Its quantitative basis is the basic model of the creep rate given by solid state theory:

$$\dot{\epsilon}_c = k_\sigma \sigma^n e^{-W_F/k_B T}, \tag{46}$$

where $k_\sigma$ is a constant of proportionality; $\sigma$ is the acting stress (tensor); n is an exponent having to do with the changing lattices formed by interaction between the dislocations; $W_F$ is the work function for breaking a single bond, typically of the order of 1 eV; $k_B$ is the Boltzmann constant ($\approx 1.38 \times 10^{-23}$ J/K); and T is the temperature of the lattice. The exponent n serves merely to account for the changing dislocation patterns over an extended range of stress, as commonly used in mechanical testing of materials. At the steady stresses and creep rates of concern in the hypothesis, n may be taken as 1, with the constant $k_\sigma$ accounting for the applicable dislocation pattern. While the direction of the creep is dictated by $\sigma$, its order of magnitude is determined principally by the last factor, which defines the probability of an individual dislocation as $$p(W,T) = p_0 e^{-W_F/k_B T}, \tag{47}$$

$p_0$ denoting a normalization constant. This probability is ordinarily very small, especially in metals, which is why they remain solids and exhibit measureable creep only under very high stresses, of the order of several mega-pascals and even so, only at elevated temperatures. At the relatively very small stresses of interest, including the crushing force of the earth's gravity on the surface and the centrifugal stress on the Pioneer (as well as Galileo and Ulysses) spacecraft due to their spin stabilization, the creep is not measureable by current creep measurement techniques.

Secondly, the spacecraft structures are made of rigid alloys that are much more resistant to creep at high stresses. For these likely reasons, among others, the possibility that creep could contribute to the anomalous data does not appear to have been examined at all by NASA, despite citing three manuscripts as mentioned.

The magnitude of this probability is poignant: $p \approx 10^{-18} s^{-1}$ at T=300 K for $W_F \approx 1.7$ eV, and could thus easily account for the Pioneer residual anomaly and $H_0$, the "Hubble constant". With the consistency of space-born telescopic data already explained above, the only remaining issue for the creep hypothesis lies in explaining the galactic tidal contribution hypothesized to be responsible for the difference between the residual rates of the two Pioneer missions. This appears to be a problem because the galactic gravitational pull itself is about three orders weaker than the sun's, and the tidal action, which follows inverse-cube rather than inverse-square law, should be even smaller. The answer lies in a saturation behaviour of tide-induced creep, which makes it independent of the magnitude of stress, thus reducing n to 0 in equation (46), and the closeness of the barrier energy $W_F$ across the structural materials used in these instruments, lying between 1 and 1.2 eV (titanium alloy, as computed from the ASM International handbook data), as follows.

Under relatively steady conditions, as at L2, the creep rate would be smaller by a few orders, and dependent on the material properties and stress. In the presence of a tidal tensor, however, the solid lattice is uniformly stretched along the instantaneous major principal axis of the tensor. This introduces elastic energy into the lattice: if the tidal tensor merely grew and ebbed without rotation, the stretching energy would return to the gravitating source with each ebb with no net effect on the lattice. The tensor however rotates, in most cases, with relatively little oscillatory change in magnitude, presenting opportunity continuously for neighbouring atoms to fall into and fill the elongated gaps of the previous direction of stretch, thereby causing dislocations. The ordinary smallness of the dislocation probability, equation (47), concerns pulling an individual atom off its location. In tidal action, however, all of the lattice bonds are stretched along the major principal axis, and unchanged or slightly diminished in the perpendicular directions, so that as the tidal axis rotates, the gap opportunities become large enough every so many lattice constants to virtually guarantee dislocation.

For example, consider the force required to pull an atom from its equilibrium position by $10^{-6}$ of a lattice constant: then every millionth atom along that direction will have been displaced by a full lattice constant, so that a dislocation is guaranteed at the half-way mark of 500,000 lattice constants, as the tidal axis turns by a right angle. The energy for dislocation comes from the angular motion, not the stretching energy, which is purely gravitational and remains elastic. This behaviour is very similar to amplification by an operational amplifier (op-amp) integrated circuit: in a typical op-amp circuit, the input impedance is extremely high and characterized by a very similar $e^{-W_F/k_B T}$ factor, where the barrier energy $W_F$ refers to the Fermi level of the charge carriers (electrons or holes) in the semiconductor lattice; no energy is taken from the signal, and the power of the amplified output comes from the d.c. driving supply. In the creep model, the signal is the rotating tidal tensor, while the energy supply comes from the relatively steady driving stress.

This was the model used in the www.arxiv.org manuscripts, but it still contained a dependency on the magnitude of the tidal forces because a larger displacement should cause dislocation in fewer lattice hops, and thus failed to provide the saturation behaviour needed for the hypothesis. The answer, discovered only recently, concerns another peculiar property of the interaction between tides and dislocations, viz dislocations in the interior of the lattice are unproductive, in the sense that the interior dislocated atoms have nowhere to go and therefore bounce around, refilling newer gaps and displacing others in a form of dynamic equilibrium. Only at the outer surfaces can the dislocated atoms fall off, so this is where the tidal damage actually occurs, and would be generally indistinguishable from ordinary erosion and wear-and-tear. This finally explains the saturation because unless the solid is smaller than say $10^8$ lattice constants, i.e. less than a millimetre, the fall off rate due to a per-atom dislocating force of $10^{-6}$ lattice constant and that due to a stronger force of $10^{-3}$ lattice constant would now be identical!

The net result is thus that under low stress conditions, tidal damage in solids depends only on the angular velocity $\Omega$ of the tidal stress tensor and independent of its magnitude, i.e.

$$\dot{\epsilon}_c = k'_\alpha \Omega e^{-W_F/k_B T} \qquad (48)$$

It should still depend on the direction of a driving stress, as illustrated in FIGS. 13 and 14. FIG. 13 illustrates the tidal shrinkage that likely affects all of our ground and low-orbit telescopes and accounts for the Hubble redshifts via the principle of the present invention. As the figure shows, every telescope [640] on earth [630] is subject to a steady compressive tidal stress due to the curvature of the earth's gravitational field, because the gravitational force vectors $\vec{g}$ at diametrically opposite points on the telescope objective must both point to the earth's centre of mass, and thus bear a tiny but nonzero compressive component of magnitude $l \cdot \nabla \vec{g}$, where l is the diameter of the objective. It is straightforward to verify that the compression tensor would be isotropic, approximating the earth as a sphere, yielding a shrinkage rate proportional to the earth's rotational velocity $\Omega_e$, under both solar and lunar tidal stresses, and to a less extent on the moon's orbit.

Although $\nabla \vec{g}$ would be a few orders smaller for orbiting telescopes, the rate of shrinkage would be identical according to this reasoning. For example, notwithstanding its orbit around the earth, the Hubble telescope is subject to the same rate of rotation of the tidal tensor during astronomical observations, as its users on earth. Differences in $W_F$ could have contributed up to one order of uncertainty between the observatories at one time. However, as the astronomers have converged on the value of $H_0$, they are increasingly using similar or the same structural materials, both on ground and on spacecraft.

The Wilkinson microwave anisotropy probe (WMAP) at L2 would at first sight seem to be an exception, since it cannot possibly be subject to the same tidal rotation rate. However, the WMAP is not equipped for any observations that directly relate to the Hubble redshifts or the cosmological time dilation (CTD), but is instead geared to measure the anisotropy of the microwave radiation, as a test of inflation theory. The value of $H_0$ reported from the WMAP data reflects the calibration of the standard model, and is not independent.

FIG. 14 illustrates the complementary phenomenon of tidal damage under expansive stress as a candidate offering detailed explanation of the anomalous data from Pioneer 10 and 11 missions. The creep hypothesis explains the variations in the anomaly seen over the life of Pioneer 10, as well as a slight difference in the residual values when the spacecraft were well beyond the solar planetary orbits. The main purpose of the spin stabilization was for keeping the spin axis [600], and therefore the telemetry antenna, pointed towards earth, whereas the principal tidal force in deep space was that of the sun, so the tidal axis [602] subtended an angle $\alpha$ to the spin axis. In the transverse plane [610] containing the telemetry devices, the centrifugal force from the spin would have produced a steady expansive stress. From the preceding theory, we would expect a minute rate of creep along the tide axis [602], and in absence of the solar tidal action, a similar minute steady expansive creep in the transverse plane, but neither would have any noticeable effect. Because of the spin stabilization, however, the solar tidal tensor rotates at the spin rate $\Omega$, causing a noticeable transverse expansion at the rate $$\dot{\epsilon}_{Pioneer} = k \| \vec{\nabla g \odot} \| \Omega e^{-W_F/K_B T} \sin(\alpha),$$

where the $\sin(\alpha)$ factor arises because the expansion is normal to the tide axis [602]. This angular dependence not only closely fits the oscillatory pattern of variations of the Pioneer 10 data, whose maxima and minima are consistent with the earth's orbital position around the sun, but closely fits the almost linear decrease in the envelope of the variations from approximately 5 AU to about 40 AU, as explained in astro-ph/9907363.

The above analysis suggests that constructing a telescope and observing the redshifts of a distant target as a suitable means of determining the tidal damage rate in an observer's locality, using the inventive relation, equation (1), in reverse. The importance of this stems from Theorem 2, since in absence of an intentionally applied modification rate, H is a measure of the perfectness of stationarity of quantum states.

I claim:

1. A method for producing, in a receiver, observable frequency shifts $\delta\omega$ indicative of the distance r to a target at one or more frequencies $\omega$ in propagating waves emitted, reflected, transmitted or scattered by the target, wherein the receiver includes a variable frontend means to select or influence the selection of frequencies or wavelengths and a shift detector means to measure the frequency shifts from the output of the frontend means, the method comprising the step of varying the instantaneous selection of frequencies or wavelengths by the frontend means at a known or predetermined normalized rate $\beta$, in order to scan the phases $\phi(\tilde{k})$ of successively selected frequencies $\tilde{k}$ at the instantaneous rates $d\tilde{k}/dt = \tilde{k}\beta$, thereby inducing in its output the shifts $\delta\omega$ in proportion to the distance r from the path contributions $\tilde{k}\cdot r$ contained in $\phi(\tilde{k})$ as $\delta\omega = \partial\phi/\partial t|_r = \partial(\tilde{k}r)/\partial\tilde{k}\cdot d\tilde{k}/dt = r\cdot\tilde{k}\beta$.

2. The method of claim 1 wherein the frontend means is varied for exponential changes in the frequency selection at a constant normalized rate $\beta$.

3. The method of claim 1 wherein the frontend means is varied nonlinearly.

4. The method of claim 1, wherein the propagating waves are electromagnetic.

5. The method of claim 4, wherein the frontend selection is over infra-red, optical or higher frequencies.

6. The method of claim 4, wherein the frontend selection is at millimetre or longer wavelengths.

7. The method of claim 1, wherein the propagating waves are acoustic.

8. The method of claim 1, wherein the propagating waves are the de Broglie waves of matter.

9. The method of claim 1, wherein the frontend means is a resonant cavity or tuned circuit.

10. The method of claim 9, wherein the frontend means is a tuned delay line circuit.

11. The method of claim 1, wherein the frontend means is a diffraction grating, a prism or a lens.

12. The method of claim 1, wherein the frontend means involves discrete sampling and the applied variation concerns varying the sampling interval.

13. The method of claim 1, wherein the target distance r is unknown, comprising the additional steps of measuring the frequency shifts $\delta\omega$ and computing the distance r from the applied rate $\beta$, the measured shifts $\delta\omega$, and the speed c of the propagating waves.

14. The method of claim 13, wherein the shifts are determined by reference to known atomic, nuclear or particle emission spectra.

15. The method of claim 1, wherein the shifts are determined by comparing the resulting spectrum at a given variation rate $\beta$ against the spectrum due to the application of a second variation rate $\beta'$.

16. The method of claim 15, wherein the second rate $\beta'$ is a multiple of the first rate $\beta$.

17. The method of claim 1 wherein distance-related frequency shifts $\delta\omega'$ equivalent to a variation rate $\beta'$ are observed a priori, and the method includes the additional steps of determining this equivalent prior rate $\beta'$, and setting the applied variation rate $\beta$ to the reverse of the equivalent a priori rate, i.e. to $-\beta'$, so as to produce frequency shifts $\delta\omega = -\delta\omega'$ that annul the a priori observed shifts $\delta\omega'$.

18. The method of claim 15, involving a multitude of targets, wherein the shifts are used to separate the targets according to the distances r to the respective targets.

19. A method for measuring ongoing damage from gravitational, tidal or centrifugal stresses within a solid material, the method involving the steps of constructing a telescopic spectrometric instrument for observing sources of propagating waves at known distances using components of said solid material, determining redshifts or blueshifts $\delta\omega$ of said sources at one or more frequencies $\omega$, computing the normalized shifts z by dividing the determined redshifts or blueshifts $\delta\omega$ by the respective unshifted frequencies $\omega$, and computing the damage rate as the product of the speed c of the propagating waves and the ratio of computed normalized shifts z to the known source distances r, i.e. as $\delta = cz/r$.

20. A device for measuring the distance to a target emitting, reflecting, transmitting or otherwise scattering propagating waves, comprising a frontend means for instantaneously selecting frequencies or wavelengths, a frequency shift determination means and a computational means, wherein the front end selection means varies its instantaneous selection $\tilde{k}$ of frequencies or wavelengths at a known normalized rate $\beta \equiv \tilde{k}^{-1}d\tilde{k}/dt$; the frequency shift determination means determines frequency shifts $\delta\omega$ in the output of the front end selection means resulting from said variation of its instantaneous selection of frequencies or wavelengths; and the computational means computes the distance r from the known normalized variation rate $\beta$ and the determined frequency shifts $\delta\omega$ via the relation $\delta\omega = r\cdot\tilde{k}\beta$.

* * * * *